(12) United States Patent
Rodriguez et al.

(10) Patent No.: US 8,283,400 B2
(45) Date of Patent: Oct. 9, 2012

(54) POLYOLEFIN ADHESIVE COMPOSITIONS

(75) Inventors: George Rodriguez, Houston, TX (US); Fran A. Shipley, Crosby, TX (US); Peijun Jiang, League City, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 283 days.

(21) Appl. No.: 12/634,222

(22) Filed: Dec. 9, 2009

(65) Prior Publication Data

US 2010/0132886 A1    Jun. 3, 2010

Related U.S. Application Data

(63) Continuation-in-part of application No. 12/616,637, filed on Nov. 11, 2009, which is a continuation-in-part of application No. 12/472,022, filed on May 26, 2009.

(60) Provisional application No. 61/060,014, filed on Jun. 9, 2008.

(51) Int. Cl.
*D21H 19/18* (2006.01)

(52) U.S. Cl. ........ 524/477; 524/487; 524/490; 524/491; 524/583

(58) Field of Classification Search ................ 156/334; 524/477, 487, 490, 491, 583
See application file for complete search history.

(56) References Cited

U.S. PATENT DOCUMENTS

| | | | |
|---|---|---|---|
| 4,345,349 A | 8/1982 | Flanagan | |
| 4,540,753 A | 9/1985 | Cozewith et al. | |
| 4,960,295 A | 10/1990 | Bodouroglou | |
| 5,001,205 A | 3/1991 | Hoel | |
| 5,026,756 A | 6/1991 | Aremdt | |
| 5,066,741 A | 11/1991 | Campbell, Jr. | |
| 5,153,157 A | 10/1992 | Hlatky et al. | |
| 5,198,401 A | 3/1993 | Turner et al. | |
| 5,206,197 A | 4/1993 | Campbell, Jr. | |
| 5,241,025 A | 8/1993 | Hlatky et al. | |
| 5,384,299 A | 1/1995 | Turner et al. | |
| 5,502,124 A | 3/1996 | Crowther et al. | |
| 5,530,054 A | 6/1996 | Tse et al. | |
| 5,548,014 A | 8/1996 | Tse et al. | |
| 5,942,459 A | 8/1999 | Sugano et al. | |
| 6,034,159 A | 3/2000 | Malcolm | |
| 6,107,430 A | 8/2000 | Dubois et al. | |
| 6,117,962 A | 9/2000 | Weng et al. | |
| 6,235,818 B1 | 5/2001 | Morizono et al. | |
| 6,399,722 B1 | 6/2002 | Szul et al. | |
| 6,747,114 B2 | 6/2004 | Karandinos et al. | |
| 6,887,941 B2 | 5/2005 | Zhou | |
| 6,906,160 B2 | 6/2005 | Stevens et al. | |
| 6,927,256 B2 | 8/2005 | Stevens et al. | |
| 6,943,215 B2 | 9/2005 | Stevens et al. | |
| 7,060,754 B2 | 6/2006 | Stevens et al. | |
| RE39,307 E | 9/2006 | Zhou | |
| 7,109,269 B2 | 9/2006 | Stevens et al. | |
| 7,199,203 B2 | 4/2007 | Stevens et al. | |
| 7,210,339 B2 | 5/2007 | Lewtas et | |
| 7,220,801 B2 | 5/2007 | Dunaway | |
| 7,223,822 B2 | 5/2007 | Abhari et al. | |
| 7,238,759 B2 | 7/2007 | Stevens et al. | |
| 7,241,493 B2 | 7/2007 | Zhou | |
| 7,250,470 B2 | 7/2007 | Stevens et al. | |
| 7,294,681 B2 | 11/2007 | Jiang et al. | |
| 7,319,077 B2 | 1/2008 | Mehta et al. | |
| 7,344,775 B2 | 3/2008 | Stevens et al. | |
| 7,396,782 B2 | 7/2008 | Blenke et al. | |
| 7,476,710 B2 | 1/2009 | Mehta et al. | |
| 7,488,777 B2 | 2/2009 | Inoue | |
| 7,524,910 B2 | 4/2009 | Jiang et al. | |
| 7,541,402 B2 | 6/2009 | Abhari et al. | |
| 7,550,528 B2 | 6/2009 | Abhari et al. | |
| 7,700,707 B2 | 4/2010 | Abhari et al. | |
| 7,750,078 B2 | 7/2010 | Curry | |
| 2002/0193474 A1 | 12/2002 | Daily et al. | |
| 2004/0045666 A1 | 3/2004 | Gong et al. | |
| 2004/0127614 A1 | 7/2004 | Jiang et al. | |
| 2004/0138392 A1 | 7/2004 | Jiang et al. | |
| 2004/0220320 A1 | 11/2004 | Abhari et al. | |
| 2004/0220336 A1 | 11/2004 | Abhari et al. | |
| 2004/0249046 A1 | 12/2004 | Abhari et al. | |
| 2007/0021566 A1 | 1/2007 | Tse et al. | |
| 2008/0081868 A1 | 4/2008 | Jiang et al. | |

(Continued)

FOREIGN PATENT DOCUMENTS

CA    2338221    2/2000

(Continued)

OTHER PUBLICATIONS

Baker Hughes, "Polywax Polyethylenes", Aug. 2001.*
J. Randall, "*IX. Long-Chain Branching in Polyethylene, Journal of Macromolecular Science*", Reviews in Macromolecular Chemistry and Physics, 1989, vol. C29, No. 2 and 3, pp. 285-297.
T. Sun et al., "*Effect of Short Chain Branching on the Coil Dimensions of Polyolefins in Dilute Solutions*", Macromolecules, 2001, vol. 34, No. 19, pp. 6812-6820.
G. Ver Strate et al., "*Near Monodisperse Ethylene-Propylene Copolymers by Direct Ziergler-Natta Polymerization. Preparation, Characterization, Properties*", Macromolecules, 1988, vol. 21, No. 12, pp. 3360-3371.

(Continued)

*Primary Examiner* — Ling Choi
*Assistant Examiner* — Wenwen Cai

(57) ABSTRACT

An adhesive and method for hot melt adhesive application. The adhesive comprises polyolefin base polymer and from 1 to 15 wt % of a at least two wax components, based on the total weight of the polyolefin base polymer and the at least two wax components, wherein the at least two wax components comprise a first wax component having a relatively low weight average molecular weight at least 1000 g/mole less than a second wax component having a relatively high weight average molecular weight. The adhesive may have at least 50% fiber tear at 25° C., and a characteristic set time of less than 3 seconds. The adhesive may also include from 1 to 10 wt % of at least one functionalized polyolefin.

24 Claims, 1 Drawing Sheet

U.S. PATENT DOCUMENTS

| | | |
|---|---|---|
| 2008/0081878 A1 | 4/2008 | Jiang et al. |
| 2008/0262148 A1 | 10/2008 | Bach et al. |
| 2009/0069475 A1 | 3/2009 | Jiang et al. |
| 2009/0306281 A1 | 12/2009 | Tancrede et al. |

FOREIGN PATENT DOCUMENTS

| | | |
|---|---|---|
| EP | 0 277 003 | 8/1988 |
| EP | 0 277 004 | 8/1988 |
| EP | 0 495 375 | 7/1992 |
| EP | 0 500 944 | 9/1992 |
| EP | 0 520 732 | 12/1992 |
| EP | 0 570 982 | 11/1993 |
| EP | 0 886 656 | 12/1998 |
| EP | 1 125 980 | 8/2001 |
| EP | 1 243 248 | 9/2002 |
| WO | 96/33227 | 10/1996 |
| WO | 97/22639 | 6/1997 |
| WO | 97/48777 | 12/1997 |
| WO | 98/43983 | 10/1998 |
| WO | 98/46694 | 10/1998 |
| WO | 00/05306 | 2/2000 |
| WO | 01/30862 | 5/2001 |
| WO | 02/34856 | 5/2002 |
| WO | 2005/100501 | 10/2005 |
| WO | 2006/044149 | 4/2006 |
| WO | 2008/042037 | 4/2008 |

OTHER PUBLICATIONS

B. Wielage et al., *"Processing of Natural-Fibre Reinforced Polymers and the Resulting Dynamic-Mechanical Properties"*, Journal of Materials Processing Technology, 2003, vol. 139, pp. 140-146.

W. Weng et al., *"Synthesis of vinyl-terminated isotactic poly(propylene)"*, Macromolecular Rapid Communication, 2000, vol. 21, No. 16, pp. 1103-1107.

Wielage, B. *"Processing of Natural-Fibre reinforced Polymers and the resulting Dynamic-Mechanical Properties"*, Journal of Materials Processing Technology, 2003, vol. 139, pp. 140-146.

U.S. Appl. No. 12/472,022, filed May 26, 2009, Tancrede et al.

\* cited by examiner

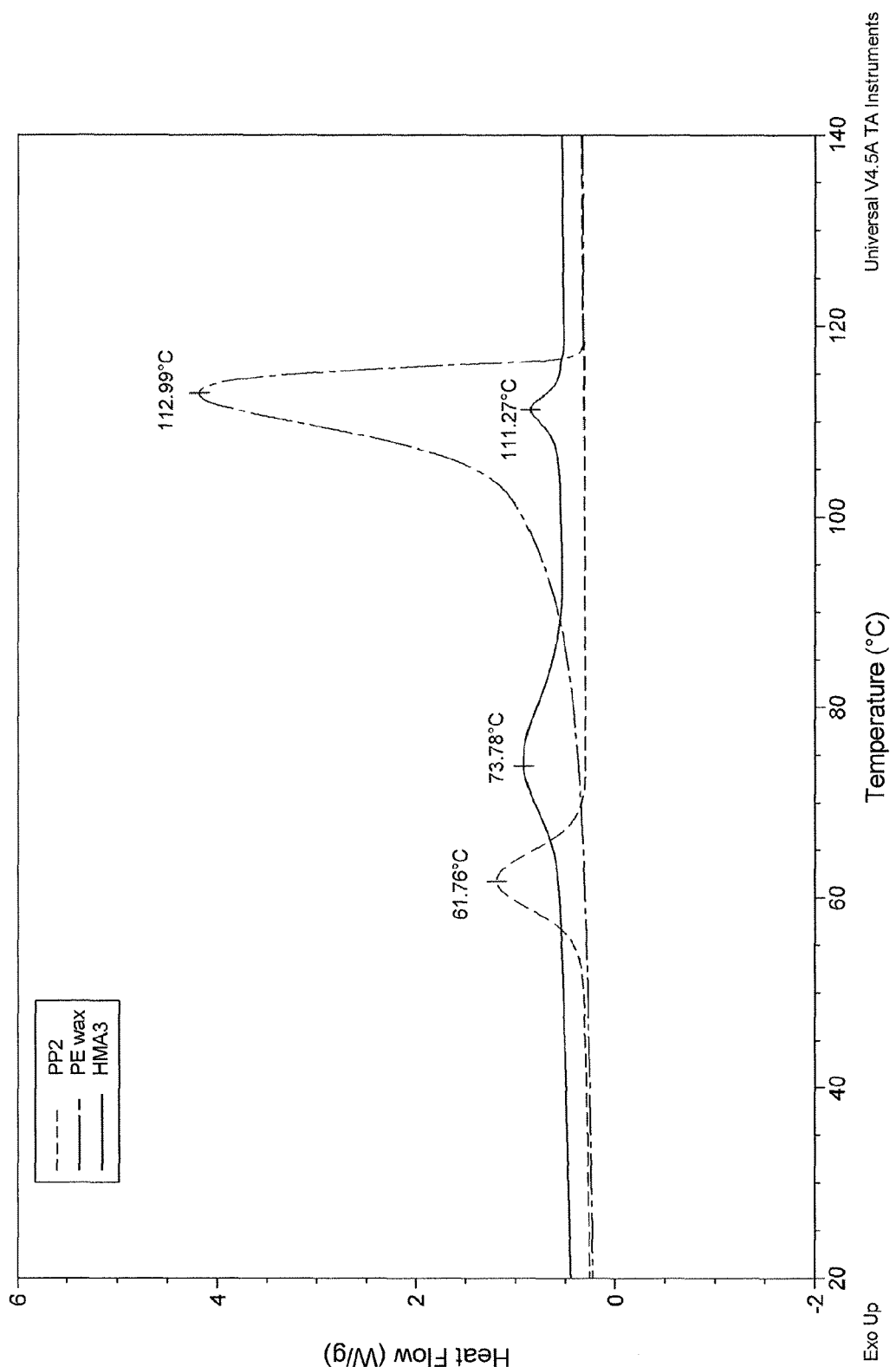

POLYOLEFIN ADHESIVE COMPOSITIONS

CROSS REFERENCE TO RELATED APPLICATIONS

This application is a continuation-in-part of U.S. application Ser. No. 12/616,637, filed Nov. 11, 2009, which is a continuation-in-part of U.S. application Ser. No. 12/472,022, filed May 26, 2009, which claims priority to U.S. Application 61/060,014, filed Jun. 9, 2008, and is related to U.S. Application Nos. 60/418,482, filed Oct. 15, 2002, 60/460,714, filed Apr. 4, 2003, 10/687,508, issued as U.S. Pat. No. 7,294,681, Ser. No. 10/686,951, issued as U.S. Pat. No. 7,524,910, Ser. No. 10/825,380, issued as U.S. Pat. No. 7,223,822, Ser. No. 10/825,635, issued as U.S. Pat. No. 7,541,402, Ser. No. 10/825,349, issued as U.S. Pat. No. 7,550,528, Ser. No. 10/825,348, filed Apr. 15, 2004, Ser. No. 11/529,839, filed Sep. 29, 2006, and Ser. No. 11/541,185, filed Sep. 29, 2006, each of which is herein incorporated by reference in its entirety.

BACKGROUND

This invention relates to polyolefin adhesive compositions and articles made therefrom, and more particularly to polyolefin adhesive compositions having a fast set time.

A hot melt adhesive (HMA) is a thermoplastic polymer system applied in a molten state. The molten adhesives are applied to a substrate and then placed in contact with another substrate. The adhesive cools and solidifies to form a bond between the substrates. Hot melt adhesives are widely used in the packaging industry, for example, to seal and close cartons or to laminate multilayer papers.

The HMA should have good adhesion over a wide temperature range, e.g. at low temperatures for packaging applications in the frozen-goods sector, and a low viscosity melt to facilitate application to the substrate, especially for automatic processing. Where applied from a heated reservoir in which it is maintained as a melt, for example, typically at 177° C. (350° F.) in the prior art, for an extended period of time, the adhesive should have oxidative resistance and good thermal stability, which is also called "pot life." The HMA should have a moderate to long open time, defined as the time span between adhesive application to a first substrate and assembly of the parts to be joined. On the other hand, a fast set time is required to quickly build up bond strength on fast-running packaging machines. The characteristic set time is defined as the time needed for the hot melt adhesive to solidify to the point where it possesses enough bond strength to form bonds to give substrate fiber tear when pulled apart, e.g., the bond is sufficiently strong such that sealed substrates will not pop open upon exit from the compression section on a packaging line. The bond may continue to build additional strength upon further cooling; however, compression is no longer required to maintain adhesion between the substrate surfaces. In reference to automatic packaging lines, the set time is referred to as the duration of the application of adhering pressure, which is generally at least equal to or greater than the characteristic set time of the HMA.

A wide variety of thermoplastic polymers, particularly ethylene-based polymers such as ethylene-vinyl acetate copolymers (EVA) have traditionally been used in HMA, but often the adhesive formulation requires substantial use of low molecular weight ingredients such as wax and tackifier to adjust the viscosity and glass transition temperature to useful ranges. Thus, EVA formulations are typically exemplified by a wax with either a low molecular weight or a low crystallization temperature. An HMA for packaging applications such as case and carton sealing is typically composed of a polymer, a tackifier or diluent, and a wax. The polymer has largely influenced the flow and mechanical properties: (a) viscosity and rheology characteristics, (b) cohesive strength, (c) flexibility, and (d) adhesive strength. The viscosity of the polymer has typically been a few orders of magnitude higher than the viscosity of the wax. Low viscosity wax has been used to reduce the high viscosity of the polymer and resin to ensure efficient mixing. This viscosity reduction is particularly important during the application stage where a low viscosity HMA is required to pump the molten adhesive from the storage tank to the application area and to ensure proper surface wetting when applied.

Currently used packaging adhesives comprise primarily petroleum-derived waxes such as paraffin and microcrystalline wax, and synthesis wax such as Fischer-Tropsch waxes. The lower molecular weight of paraffin wax is the primary choice when formulating low application temperature adhesives. The waxes used also generally have a crystallization temperature of less than 100° C. Due to high molecular weight of the base polymer, low molecular weight wax is necessary to reduce the viscosity of the HMA to an applicable range. Large amounts of wax are also required for set time control since wax helps control the set time. However, in certain polymers, large amounts of wax can form large segregated domains or migrate onto the bonding surface. The large difference in the molecular weight between the polymer and the wax has contributed to the wax migration.

The HMA attributes required for short set time, good bonding strength, cohesive strength and low viscosity are generally against each other. Generally selecting optimum performance is a matter of trading off one property against another, for example, reducing set time decreases adhesion at low temperature. It is challenging to obtain the desired balance among set time, bonding strength and low viscosity. Most prior art adhesives are optimized either for good adhesion, while sacrificing set time, or for a fast set time, while sacrificing adhesion at low temperatures.

The adhesion industry continues to search for adhesive compositions having a balance of properties. Accordingly, there exists a current and long felt need for adhesive compositions that overcome known deficiencies in conventional compositions and have advantageous processing properties.

It is desirable for certain hot melt adhesive compositions (e.g. packaging grades) to exhibit a good balance of fast set time and bonding strength. Good balance is achieved by selection of specific base polymers and wax blends. Adding polyethylene wax above certain levels to a polyolefin base polymer reduces set times, but at high levels can also cause a dramatic reduction in adhesion, which is sometimes referred to in terms of fiber tear (FT). This deleterious effect on adhesion may be due to surface migration of the wax. On the other hand, higher molecular weight waxes can exhibit slower surface migration relative to lower molecular weight analogs and hence better adhesion. However, the set times are longer when the adhesives are formulated with these relatively higher molecular weight waxes. Unexpectedly, the problem of improving the balance of set time versus adhesion is solved by employing a bimodal wax mixture. Blends of two or more waxes of different molecular weights, i.e., one with a relatively low weight average molecular weight (Mw) and another with a relatively high Mw, allow the formulation of adhesives of polyolefin base polymer exhibiting both improved adhesion performance and improved (reduced) set times.

U.S. discloses a hot melt adhesive composition consisting essentially of: (a) 30-70 wt % of an ethylene copolymer having about 6 to about 30 wt % of a C4 to C20 α-olefin produced in the presence of a catalyst composition comprising a metallocene and having an Mw of from about 20,000 to about 100,000; and (b) a hydrocarbon tackifier. Tse et al, U.S. Pat. No. 5,548,014, claims a hot melt adhesive composition comprising a blend of ethylene/α-olefin copolymers wherein the first copolymer has an Mw from about 20,000 to about 39,000 and the second copolymer has a Mw from about 40,000 to about 100,000. Each of the hot melt adhesives exemplified comprises a blend of copolymers, contains 45 wt % copolymer, with at least one of the copolymers having a polydispersity greater than 2.5. Furthermore, the lowest density copolymer exemplified has a specific gravity of 0.894 g/cm$^3$, and the ARISTOWAX 165 used in the examples has a melting temperature from 68 to 74° C.

EP 0 886 656 discloses a hot melt adhesive comprising (a) from 5 to 95 weight of at least one interpolymer which is homogeneous ethylene/α-olefin interpolymer, the α-olefin being selected from the group consisting of 1-butene, 1-hexene, 4-methyl-1-pentene, 1-pentene, 1-heptene and 1-octene characterized as having a density from 0.850 to 0.885 g/cm$^3$, and a molecular weight distribution Mw/Mn from 1.5 to 2.5; (b) from 5 to 95 wt % of at least one tackifier; (c) from 0 to about 90 wt % of at least one plasticizer; and (d) from 0 to 90 wt % of at least one wax. EP 0 886 656 also stated that waxes useful in the adhesives of its invention include paraffin waxes, microcrystalline waxes, Fischer-Tropsch, polyethylene and by-products of polyethylene wherein Mw is less than 3000.

SUMMARY

One embodiment disclosed herein is a composition having utility as an adhesive, especially a hot melt adhesive, comprising at least one polyolefin base polymer and at least two wax components. In an embodiment, the adhesive composition comprises from 1 to 10 wt % of at least one functionalized polyolefin, and in another embodiment the polyolefin base polymer is alternatively or additionally functionalized. The molecular weight of a first wax component is sufficiently low to reduce set time, whereas a second wax component has a molecular weight sufficiently high to improve adhesion. In one embodiment, the difference between the weight average molecular weight of the first wax component ($Mw_{wax1}$) and the weight average molecular weight of the second wax component ($Mw_{wax2}$) is at least about 1000 g/mole (($Mw_{wax2}-Mw_{wax1}) \geq 1000$ g/mole) or at least about 2000 g/mole (($Mw_{wax2}-Mw_{wax1}) \geq 2000$ g/mole) or at least about 3000 g/mole (($Mw_{wax2}-Mw_{wax1}) \geq 3000$ g/mole) or at least about 4000 g/mole (($Mw_{wax2}-Mw_{wax1}) \geq 4000$ g/mole) or at least about 5000 g/mole (($Mw_{wax2}-Mw_{wax1}) \geq 5000$ g/mole). In an embodiment, $Mw_{wax1}$ is less than about 4000, for example, from about 450 to 4000 g/mole or from about 500 to 4000 g/mole, and $Mw_{wax2}$ is above about 5000, for example from about 5000 to 20,000 g/mole.

In an embodiment, said adhesive has a Shear Adhesion Fail Temperature (SAFT) of at least 100° C.

BRIEF DESCRIPTION OF THE DRAWINGS

FIG. 1 shows DSC curves for the adhesive composition according to the embodiment of Example HMA3 and also for the neat PP2 propylene/hexene copolymer and PEwax1, indicating the copolymer crystallization temperature is higher in the HMA formulation due to the presence of the wax.

DETAILED DESCRIPTION OF THE INVENTION

The term "polymer" as used herein refers to high molecular weight molecules comprising repeating units, generally having a weight average molecular weight of at least about 5000 g/mol. As used herein molecular weight refers to the weight average molecular weight in g/mol unless otherwise specified. When two or more base polymer components are used, the weight average molecular weight, viscosity and crystallization temperature of the base polymer used herein refer to the weight average molecular weight, viscosity and crystallization temperature of the blend of all base polymer components used in the adhesive or hot melt adhesive (HMA) mixture.

For purposes of this disclosure when a polymer or oligomer is referred to as comprising an olefin, the olefin present in the polymer or oligomer is the polymerized or oligomerized form of the olefin, respectively. Likewise, the use of the term "polymer" is meant to encompass homopolymers and copolymers. The term "copolymer" is used herein to include any polymer having two or more monomers. That is, in the case of a propylene copolymer, at least one other comonomer is polymerized with the propylene to make the copolymer.

Disclosed herein as an embodiment is an adhesive comprising a polyolefin polymer as the base polymer and from 1 to 15 wt % of at least two wax components, wherein the at least two wax components comprise a first and a second wax components having a difference in their respective weight average molecular weights of at least 1000 g/mole, wherein a weight ratio of the first and second wax components is from 10:90 to 90:10, and wherein the adhesive has the following properties: (a) at least 50% fiber tear at 25° C. using Inland paper board as a substrate; and (b) a set time of less than 2 seconds. In one embodiment, the Brookfield viscosity of the first wax component at 190° C. is from about 100 mPa·s or less, and the Brookfield viscosity of the second wax component at 190° C. is from about 190 mPa·s or more. In an embodiment, the adhesive also has a viscosity at 177° C. of from about 500 to about 2000 mPa·s, or from about 700 to about 1100 mPa·s. Unless a shear rate is specified, viscosity values given herein refer to the zero-shear viscosity, i.e., the viscosity at the limit of low shear rate, based upon extrapolation from measurements at 190° C. using a BROOKFIELD viscometer or similar instrument at low shear rates, e.g., within the range of about 0.01 to about 10 1/s. In another embodiment, the adhesive may comprise 2 to 15 wt %, 3 to 15 wt %, 4 to 15 wt %, 5 to 15 wt %, and 6 to 15 wt % of the at least two wax components.

In an embodiment, said adhesive is a hot melt adhesive. Hot melt adhesives are adhesives that are typically solid (or exhibit glass like cold flow) at use temperature (such as room temperature, e.g. 23° C.) and molten at application temperatures such as 120° C. or more (preferably 130° C. or more, preferably 140° C. or more, preferably 160° C. or more).

In one embodiment, the invention is directed to an adhesive composition, as disclosed in U.S. application Ser. No. 12/472,022, filed May 26, 2009, which is incorporated by reference herein in its entirety, comprising at least about 50 wt % polypropylene and a wax, wherein the polypropylene has an Mw of from 10,000 to 100,000 g/mol and a branching index (g') of (1) from 0.4 to 0.98 measured at the Mz of the polypropylene when the polypropylene has an Mw of 10,000 to 60,000, or (2) from 0.4 to 0.95 measured at the Mz of the polypropylene when the polypropylene has an Mw of 10,000 to 100,000, wherein the adhesive composition has a Dot T-Peel of about 1 Newton or more, and a Dot Set Time of less than about 3 seconds, and wherein the at least two wax components comprise a first and a second wax component wherein $Mw_{wax1}$ is less than about 4000, for example, from about 450 to 4000 g/mole or from about 500 to 4000 g/mole, and $Mw_{wax2}$ is above about 5000, for example from about 5000 to 20,000 g/mole.

In one embodiment, the adhesive comprises at least 80 wt % of the polyolefin base polymer (based on the total weight of the adhesive and wherein the polyolefin base polymer weight is exclusive of any functionalized polyolefin and the wax components), and the polyolefin base polymer is a propylene copolymer comprising at least 80 wt % of units derived from propylene and from about 2 to about 15 wt % of units derived from at least one $C_4$ to $C_{10}$ alpha-olefin, wherein the copolymer has an Mw of less than 100,000 g/mol and a heat of fusion between about 10 and about 70 J/g.

In an embodiment, the propylene copolymer comprises about 2 wt % to about 25 wt %, preferably about 2 wt % to about 15 wt %, preferably from 6 wt % to 12 wt %, of units derived from said at least one $C_4$ to $C_{10}$ alpha-olefin.

In an embodiment, said at least one alpha-olefin has 6 to 8 carbon atoms and more preferably comprises hexene-1.

In an embodiment, said copolymer has an Mw of less than 80,000, such as less than 50,000 g/mol.

In an embodiment, said copolymer has an Mw/Mn of between 1.5 and 10, such as between 1.5 and 9 or between 1.8 and 7 or between 1.8 and 4.

In an embodiment, said copolymer has a heat of fusion between about 10 and about 60 J/g, such as between about 20 and about 60 J/g.

In an embodiment, the polyolefin base polymer alternatively or additionally comprises polypropylene having a weight average molecular weight of from 10,000 to 100,000 and a branching index (g') from 0.4 to 0.95 measured at the Mz of the polypropylene.

In embodiments, as measured by Dot Set Time (also referred to as set time), the set time is greater than about 1 second, from about 1.5 seconds to about 3 seconds, or from about 1.5 to about 2.5 seconds. In embodiments, at least one of the wax components has one or more of the following characteristics: substantially linear; a viscosity greater than about 190 mPa·s at 190° C.; a peak melting point greater than about 100° C.; a weight average molecular weight equal to or great than about 5000 g/mol; the wax is a polymer; the wax comprises polyethylene, and/or the wax imparts a set time improvement of about 33% or more compared to a reference composition prepared with the same polymer compositions and a SASOL C80 wax. Substantially linear is defined as a g'vis of 0.99 or greater.

In an embodiment, the Brookfield viscosity of the first wax component at 190° C. is from about 100 mPa·s or less, for example from 60 to 100 mPa·s, and the Brookfield viscosity of the second wax component at 190° C. is from about 190 mPa·s or more, for example from 190 to 10,000 mPa·s. Unless otherwise stated all viscosities described herein are Brookfield viscosity determined as described in the Experimental section.

In one embodiment, the weight ratio of the first wax to the second wax is within a range from about 10:90 to about 90:10, from about 25:75 to about 75:25, or from about 40:60 to about 60:40.

In one embodiment, the adhesive comprises a copolymer of propylene with at least one $C_4$ to $C_{10}$ alpha-olefin such as butene-1, hexene-1, and octane-1, wherein the copolymer has a molecular weight of less than 100,000 g/mol and a heat of fusion between about 10 and about 70 J/g. When used as an adhesive, and in particular as a hot melt adhesive, the mixture in one embodiment exhibits a novel and advantageous combination of properties including at least 5% fiber tear at −18° C. and at least 50% fiber tear at 25° C. using Inland paper board as a substrate, a viscosity of less than 50,000 mPa·s at 190° C., a set time of less than 2 seconds and improved mechanical properties such as a toughness of at least 3.4 megajoule/m$^3$ or more when the viscosity at 190° C. is less than 1000 mPa·s; a toughness of 7 megajoule/m$^3$ or more and an elongation of 100% or more when viscosity at 190° C. is in a range from 1000 to 10,000 mPa·s; and a toughness greater than 14 megajoule/m$^3$ and an elongation of 400% or more when the viscosity at 190° C. is greater than 10,000 mPa·s.

In another embodiment, the adhesive comprising a polyolefin base polymer, from 1 to 10 wt % of at least one functionalized polyolefin; and from 1 to 15 wt % of at least two wax components, wherein the copolymer has a zero-shear viscosity at 190° C. of 1500 mPa·s or less, preferably 1000 mPa·s or less. In view of the low viscosity of the base polymer, the adhesives typically contain at least 80 wt % of the base polymer, or stated differently, a total of no more than 20 wt %, such as no more than 15 wt %, of other components including the functionalized polyolefin and the at least two wax components.

According to embodiments of the invention the base polyolefin polymer can include polyethylene, ethylene copolymer such as ethylene/alpha-olefin copolymers and ethylene vinyl acetate; natural rubber or block copolymer elastomers (for example, styrene-isoprene-styrene block copolymers, styrene-butadiene-styrene block copolymers, and styrene-butadiene random copolymers); acrylics (such as interpolymers of butyl acrylate, 2-ethyl hexyl acrylate, and methyl methacrylate); and polypropylene such as polypropylene homopolymers and polypropylene copolymers; and amorphous polyolefins, and the like, amorphous $C_3$ and greater α-olefins, such as atactic polypropylene, propylene copolymers having ethylene or higher order α-olefins, and polybutene.

In one embodiment, base polymer components for use in formulating hot melt adhesives of embodiments of the invention are propylene homo- and co-polymers and mixtures thereof, especially propylene copolymers. The propylene copolymer component of this embodiment comprises at least 80%, preferably at least 85% by weight of units derived from propylene. Generally, the maximum concentration of propylene-derived units in the copolymer component is 98%, preferably 95%, more preferably 90% by weight of the copolymer. In addition to propylene-derived units, the copolymer component contains from 1 to 20% by weight, preferably from about 2% to about 15% by weight, more preferably about 6% to about 12% by weight of units derived from at least one $C_6$ to $C_{10}$ alpha-olefin. In one preferred embodiment, the copolymer comprises about 90 wt % of propylene-derived units and about 10 wt % of units derived from said at least one $C_6$ to $C_{10}$ alpha-olefin.

Preferred $C_6$ to $C_{10}$ alpha-olefins are those having 6 to 8 carbon atoms, with the most preferred alpha-olefin being hexene-1.

The copolymer of this embodiment can contain small amounts, generally less than 10% by weight of units derived from other comonomers, such as ethylene, $C_4$ and $C_5$ alpha-olefins and $C_{11}$ to $C_{20}$ alpha-olefins, but preferably the copolymer consists essentially of units derived from propylene and one or more $C_6$ to $C_{10}$ alpha-olefins, i.e., the copolymer is free of other deliberately added monomer derivatives or stated differently, the copolymer comprises a total of at least 98 or 99 wt % of the propylene and $C_6$ to $C_{10}$ alpha-olefin(s) units.

The present copolymer embodiment has a heat of fusion as determined by differential scanning calorimetry (DSC)

between about 10 and about 70 J/g, for example between about 10 and about 60 J/g, such as from about 20 to about 50 J/g, such as between about 20 and about 40 J/g. The copolymer typically has a melting point of less than 130° C., or preferably less than 120° C. This melting point is due to crystallizable propylene sequences, preferably of isotactic polypropylene. The semi-crystalline copolymer has stereoregular propylene sequences long enough to crystallize, preferably predominately isotactic polypropylene. The length and distribution of stereoregular propylene sequences is consistent with the substantially random statistical copolymerization. It is well known that sequence length and distribution are related to the copolymerization reactivity ratios. By substantially random, we mean copolymer for which the product of the reactivity ratios is 2 or less. In stereoblock structures, the average length of polypropylene sequences is greater than that of substantially random copolymers with a similar composition. Prior art polymers with stereoblock structure have a distribution of polypropylene sequences consistent with these blocky structures rather than a random substantially statistical distribution. The reactivity ratios and sequence distribution of the polymer can be determined by C-13 NMR which locates the comonomer residues in relation to the neighboring propylene residues. This is according to the procedures described in the article by H. Kakugo, Y Naito, K. Mizunama and T. Miyatake in Macromolecules (1982), pages 1150-1152.

The weight average molecular weight (Mw) in g/mol of the copolymer of this embodiment is preferably less than 100,000 and typically less than 80,000, such as less than 70,000, less than 60,000 and less than 50,000. In general, the weight average molecular weight of the copolymer is at least 5,000, such as at least 10,000, at least 15,000, at least 20,000, at least 25,000, at least 30,000, at least 35,000 and at least 40,000. Typically, the ratio of the weight average molecular weight (Mw) of the copolymer to the number average molecular weight (Mn) of the copolymer is between 1.5 and 9, such as between 1.5 and 7 or between 1.8 and 4. Generally, the semi-crystalline copolymer has a viscosity of less than 50,000 mPa·s, for example less than 25,000 mPa·s, such as less than 10,000 mPa·s, for example less than 5,000 mPa·s, typically less than 1,000 mPa·s measured at 190° C. using a Brookfield viscometer.

In another embodiment, the base polymers comprise long chain branched molecular structures. Degree of long chain branch can be measured using a branching index as defined below. The value of branching index is less than one for branched polymers, and lower value indicates higher level of branching. Preferably, the base polymer has viscosity average branching index of 0.98 or less, more preferably 0.96 or less.

Preferably, the hot melt adhesives comprise only one propylene copolymer. Alternatively, a blend of two or more propylene copolymers can be used in HMAs. For example, one component can be a low viscosity/high crystalline propylene copolymer and another component can be a high viscosity/low crystalline propylene copolymer. High viscosity/low crystalline component provides the HMAs with good cohesive strength, surface wetting and flexibility, while low viscosity/high crystalline propylene copolymer will enhance the crystallization and shorten the set time. Combination of two different components provides opportunity to further improve adhesive performance. The percent of each component in the adhesives depends on the requirements of end use.

In another embodiment, the base polymer component of the adhesive composition consists essentially of a blend of two or more propylene copolymers. Such blends may be produced by mixing the two or more polymers together, by connecting reactors together in series to make reactor blends, by connecting reactors together in parallel to make reactor blends or by using more than one catalyst in the same reactor to produce multiple species of polymer. The polymers can be mixed together prior to being mixed into the adhesive blend with the wax blend, functionalized polyolefin or other components, or may be mixed in the adhesive blending operation.

Polypropylene may be prepared by any conventional synthesis processes. Preferably, polypropylene is prepared utilizing one or more catalysts, which are typically metallocene catalysts. In single catalyst systems, polymer compositions containing amorphous and semi-crystalline components may be prepared in a multi-reactor or multi-stage polymerization to yield desired property balance. In particular, aPP-g-scPP branch structures may be produced in-situ in a continuous solution reactor. In multiple catalyst systems, at least one catalyst is selected as being capable of producing essentially atactic polypropylene (aPP), and at least one other catalyst, e.g., a second catalyst, is selected as being capable of producing semi-crystalline (scPP) polypropylene, preferably isotactic polypropylene (iPP) under the polymerization conditions utilized.

In another embodiment the hot melt adhesives comprise impact copolymers. Impact copolymers are defined to be a physical or reactor blend of isotactic PP and an elastomer such as an ethylene-propylene rubber.

In another embodiment, the base polymer components used in the adhesives of the invention may, as an alternative or in addition to the propylene copolymer component, comprise at least one ethylene polymer, and may comprise a blend of two or more polymers. The term ethylene polymer, as used herein, refers to homopolymers, copolymers and terpolymers of ethylene.

In a particularly desirable embodiment, the ethylene polymers have a density of 0.91 $g/cm^3$ or less, as determined by ASTM D1505 (preferably from above 0.84 to less than 0.910 $g/cm^3$), and a melt index (MI) of 200 dg/min or more (preferably 500 dg/min or more), as determined by ASTM D1238 (190° C., 2.16 kg). In one embodiment, the ethylene polymer is a copolymer of ethylene and at least one $C_3$ to $C_{12}$ α-olefin, preferably $C_4$ to $C_8$ α-olefins. The amount of $C_3$ to $C_{12}$ α-olefin present in the ethylene copolymer ranges from 2 wt % to 45 wt % in one embodiment, and from 10 wt % to 30 wt % in another embodiment, and from 15 wt % to 25 wt % in yet another embodiment, and from 20 wt % to 30 wt % in yet another embodiment.

The weight average molecular weight of preferred ethylene polymers ranges from 10,000 to 800,000 g/mole in one embodiment, and from 20,000 to 400,000 g/mole in another embodiment, from 20,000 to 100,000 g/mole in another embodiment. The 1% secant flexural modulus (ASTM D790) of preferred ethylene polymers ranges from 5 to 100 MPa in one embodiment, and from 10 MPa to 50 MPa in another embodiment. Further, preferred ethylene polymers that are useful in compositions of the present invention have a melting temperature of from 0 to 120° C. in one embodiment, and from 10 to 100° C. in another embodiment. The degree of crystallinity of preferred ethylene polymers is between 3 and 70%. In another embodiment, the ethylene polymers preferably have a peak crystallization temperature of 0° C. or more, more preferably 10° C.

Particularly preferred ethylene copolymer useful in the present invention are synthesized using a single-site catalyst, such as a metallocene catalyst, and comprise copolymers of ethylene and higher α-olefins such as propylene, 1-butene, 1-hexene and 1-octene, and which contain enough of one or more of these comonomer units to yield a density between 0.84 and 0.91 g/cm$^3$ in one embodiment. The molecular weight distribution ($M_w/M_n$) of desirable plastomers ranges from 1.5 to 5 in one embodiment, and from 2.0 to 4 in another embodiment.

Preferred ethylene polymer also includes low density polyethylene ("LDPE") prepared at high pressure using free radical initiators, or in gas phase processes using Ziegler-Natta or vanadium catalysts. LDPE typically has a density in the range of 0.916-0.940 g/cm$^3$. Polyethylene in the same density range, i.e., 0.916 to 0.940 g/cm$^3$, which is linear and does not contain long chain branching is also includes; this "linear low density polyethylene" ("LLDPE") can be produced with conventional Ziegler-Natta catalysts or with metallocene catalysts. Relatively higher density LDPE, typically in the range of 0.928 to 0.940 g/cm$^3$, is sometimes referred to as medium density polyethylene ("MDPE"). HDPE has a density of greater than 0.940 g/cm$^3$, and is generally prepared with Ziegler-Natta catalysts. Very low density polyethylene ("VLDPE") is also included. VLDPEs can be produced by a number of different processes yielding polymers with different properties, but can be generally described as polyethylene having a density less than 0.916 g/cm$^3$, typically 0.890 to 0.915 g/cm$^3$ or 0.900 to 0.915 g/cm$^3$.

In another embodiment, the ethylene copolymers include elastomers (EP(D)M). For elastomers, the comonomer content typically ranges from 10 to 30 wt % and density ranges from 0.910 to 0.860 g/cc. Preferably they are ultra-low-density polyethylene copolymers made using metallocene catalysts. The uniform comonomer insertion results in low-density plastomer exhibiting both plastic and elastomeric behavior. Compared to LLDPE, plastomers are lower in density, tensile strength, flexural modulus, hardness, and melting point. They exhibit higher elongation and toughness and are substantially higher in clarity, with very low haze values at lower densities. Preferably, the EPDM has a Mooney viscosity ML (1+4)@125° C. of less than 100.

In a preferred embodiment the base polymers for the inventive adhesive compositions include metallocene polyethylenes (mPE's) or metallocene polypropylenes (mPP's). The mPE and mPP homopolymers or copolymers are typically produced using mono- or bis-cyclopentadienyl transition metal catalysts in combination with an activator of alumoxane and/or a non-coordinating anion in solution, slurry, high pressure or gas phase. The catalyst and activator may be supported or unsupported and the cyclopentadienyl rings may be substituted or unsubstituted. Several commercial products produced with such catalyst/activator combinations are commercially available from ExxonMobil Chemical Company in Houston, Tex. under the tradenames EXCEED™, ACHIEVE™ and EXACT™. For more information on the methods and catalysts/activators to produce such mPE homopolymers and copolymers see WO 94/26816; WO 94/03506; EPA 277,003; EPA 277,004; U.S. Pat. Nos. 5,153, 157; 5,198,401; 5,240,894; 5,017,714; CA 1,268,753; U.S. Pat. No. 5,324,800; EPA 129,368; U.S. Pat. No. 5,264,405; EPA 520,732; WO 92 00333; U.S. Pat. Nos. 5,096,867; 5,507,475; EPA 426 637; EPA 573 403; EPA 520 732; EPA 495 375; EPA 500 944; EPA 570 982; WO91/09882; WO94/03506 and U.S. Pat. No. 5,055,438.

In another embodiment the base polymer is present in the adhesive composition at 50 wt % or more based on the total weight of the adhesive composition, preferably 70 wt % or more, even more preferably 80 wt % or more. In another embodiment, the polymer component of the adhesive composition comprises a blend of two or more copolymers. Such blends may be produced by mixing the two or more polymers together, by connecting reactors together in series to make reactor blends, by connecting reactors together in parallel to make reactor blends or by using more than one catalyst in the same reactor to produce multiple species of polymer. The polymers can be mixed together prior to being mixed into the adhesive blend with the at least two wax components, functionalized polyolefin or other components, or may be mixed in the adhesive blending operation.

In one embodiment, ethylene copolymers have one or more polar monomers, such as vinyl acetate or other vinyl esters of monocarboxylic acids, or acrylic or methacrylic acid or their esters with methanol, ethanol or other alcohols. Included are ethylene vinyl acetate, ethylene methyl acrylate, ethylene n-butyl acrylate, ethylene acrylic acid, ethylene methacrylate, ethylene 2-ethylhexylacrylate, ethylene octane, ethylene butene and mixtures and blends thereof. Ethylene n-butyl acrylate and ethylene vinyl acetate, as well as mixtures thereof, are particularly preferred.

In another embodiment, the base polymer consists essentially of non-polar monomers, i.e., it is free of deliberately added non-polar monomers or contains less than 1 wt % of polar monomer derived units. In an embodiment, the base polymer comprises at least 98 or at least 99 wt % non-polar monomer derived units.

In one embodiment, the base polymer and the at least two wax components of the adhesive composition are blended with a functionalized polyolefin such that the resulting adhesive composition comprises a nonzero amount, e.g., about 0.005 or 0.01 wt %, up to 10 wt % of the functionalized polyolefin, preferably from 1 to 6 wt %, for example, from 1.5 to 4 wt %. The functional group (typically an unsaturated acid or anhydride) is preferably present in the adhesive composition at about 0.1 wt % to about 10 wt %, preferably at about 0.5 wt % to about 7 wt %, even more preferably at about 1 to about 4 wt %, based upon the total weight of the copolymer or other base polymer, at least two wax components and the functionalized polyolefin.

In an embodiment, the functionalized polyolefin comprises from 1 to 6 wt %, of the adhesive, for example, from 1.5 to 4 wt % of the adhesive.

In an embodiment, the functionalized polyolefin has an acid number from 10 to 100, for example, from 20 to 60. Acid number is determined according to ASTM D974. In one embodiment the functionalized polyolefin comprises maleated polypropylene.

By "functionalized" is meant that the polymer has been contacted with an unsaturated acid or anhydride. Preferred unsaturated acids or anhydrides include any unsaturated organic compound containing at least one double bond and at least one carbonyl group. Representative acids include carboxylic acids, anhydrides, esters and their salts, both metallic and non-metallic. Preferably, the organic compound contains an ethylenic unsaturation conjugated with a carbonyl group (—C═O). Examples include maleic, fumaric, acrylic, methacrylic, itaconic, crotonic, alpha-methyl crotonic, and cinnamic acids as well as their anhydrides, esters and salt derivatives. Particularly preferred functional groups include maleic acid and maleic anhydride. Maleic anhydride is particularly preferred.

In an embodiment, the unsaturated acid or anhydride derived unit is preferably present in the functionalized polyolefin at about 2 wt % to about 10 wt %, preferably at about 2 wt % to about 5 wt %, even more preferably at about 1 to about 4 wt %, based upon the total weight of the polyolefin which is functionalized and the unsaturated acid or anhydride. In one embodiment, the functionalized polyolefin component has an acid number from 10 to 100, for example, from 20 to 60. In one preferred embodiment the functionalized polyolefin is maleated polypropylene or propylene copolymer. Preferably, the functionalized polyolefin has a weight average molecular weight of 10,000 g/mol or more, more preferably, 20,000 g/mol or more. The viscosity of the functionalized polyolefin is typically 100 mPa·s or more at 190° C. The functionalized polyolefin can be amorphous or semi-crystalline polymer, preferably having a degree of crystallinity of 70 wt % or less as measured by DSC.

Preferably, the functionalized polyolefin is miscible with the base polymer. In an embodiment, the mixture of the functionalized polyolefin and the base polymer has a homogeneous morphology. Preferably, the molecular weight and crystallinity of the functioned polyolefin are compatible with the crystalline segments of the base polymer so they can be co-crystallized. By homogeneous blend is meant a composition having substantially one morphological phase in the same state. For example a blend of two polymers where one polymer is miscible with another polymer is said to be homogeneous in the solid state. Such morphology is determined using scanning electron microscopy. By miscible is meant that that the blend of two or more polymers exhibits single-phase behavior for the glass transition temperature, e.g. the Tg would exist as a single, sharp transition temperature on the DMTA trace. By contrast, two separate transition temperatures would be observed for an immiscible blend, typically corresponding to the temperatures for each of the individual components of the blend. Thus a polymer blend is miscible when there is one Tg indicated on the DMTA trace.

The functionalized polyolefin component that may be added to the polyolefin base polymer can alternatively be or additionally include a functionalized wax.

The Dynamic Mechanical Thermal Analysis (DMTA) test provides information about the small-strain mechanical response (relaxation behavior) of a sample as a function of temperature over a temperature range that includes the glass transition region and the visco-elastic region prior to melting. Typically, samples are tested using TA Instruments DMA 2980. A solid rectangular compression molded plaque is placed between two aluminum plates and periodic deformation is applied to the sample at a frequency of 1 Hz and amplitude of 20 m. The sample is initially cooled to −130° C. then heated to 60° C. at a heating rate of 3° C./min. The periodic deformation is applied at a frequency of 1 Hz and strain amplitude of 0.05%. The sample is cooled to −130° C. and then heated to 60° C. at a rate of 2° C./min. The output of these DMTA experiments is the storage modulus (E') and loss modulus (E"). The storage modulus measures the elastic response or the ability of the material to store energy, and the loss modulus measures the viscous response or the ability of the material to dissipate energy. Tan-delta is the ratio of E"/E' and gives a measure of the damping ability of the material. The beginning of the broad glass transition (b-relaxation) is identified as the extrapolated tangent to the tan-delta peak. In addition, the peak temperature and area under the peak are also measured to more fully characterize the transition from glassy to visco-elastic region. Thus the glass transition temperature is the peak temperature associated with the b-relaxation peak.

Another embodiment disclosed herein, is directed to an adhesive, alternatively or in addition to having one or more of the characteristics of the adhesive composition summarized above, comprising a polyolefin base polymer and from 1 to 15 wt % of at least two wax components, based on the total weight of the polyolefin base polymer and the at least two wax components, wherein the at least two wax components comprise a first and a second wax component having a difference in their respective weight average molecular weight of at least 1000 g/mole (preferably at least 2000 g/mole) wherein a weight ratio of the first and second waxes is from 10:90 to 90:10. In one embodiment, the adhesive has the following properties: (a) at least 50% (preferably at least 60%, preferably at least 70%, preferably at least 80%) fiber tear at 25° C. using Inland paper board as a substrate; and (b) a set time of less than 2 seconds (preferably between 0.5 and 1.5 seconds). In an embodiment, the adhesive composition comprises from 1 to 10 wt % of at least one functionalized polyolefin, and in another embodiment the polyolefin base polymer is alternatively or additionally functionalized. In an embodiment, the adhesive also has a viscosity at 177° C. of from about 500 to about 2000 mPa·s (preferably from about 700 to about 1100 mPa·s).

In an embodiment, the at least two wax components can be blended prior to addition to the polyolefin base polymer wherein the wax blend is bimodal, e.g., a blend of two or more waxes with different molecular weights.

In an embodiment, the at least two wax components comprise from 6 to 15 wt % of the adhesive or from 8 to 15 wt % of the adhesive.

In an embodiment, the at least two wax components comprise at least one wax component that has a molecular weight up to 150% of the molecular weight of the polyolefin base polymer, and/or a molecular weight at least 15% of the weight average molecular weight of the polyolefin base polymer, for example, from 15% to 150% of the molecular weight of the polyolefin base polymer.

In an embodiment, the crystallization temperature of at least one wax component in the at least two wax components is greater than 110° C. In a further embodiment, the polyolefin base polymer in the adhesive blend has a crystallization temperature at least 10° C. greater than the Tc of the neat polyolefin base polymer (preferably at least 15° C. greater, preferably at least 20° C. greater).

In an embodiment, the adhesive composition exhibits a fiber tear at 2° C. of about 20% or greater. In an embodiment, the adhesive composition is substantially free of tackifier; preferably, tackifier is present at less than 0.1 wt %, based upon the weight of the composition, preferably at 0 wt %.

In one embodiment, the inventive hot melt adhesives comprise at least two wax components wherein each wax component has a different weight average molecular weight. Waxes are critical to reduce the viscosity of the adhesive and more importantly help control the set time of the adhesive through the crystallization mechanism. For example, the first and second wax components having different molecular weights can be selected for a synergistic balance of set time reduction, improved surface wetting and adhesion, improved tensile strength, and the like. The difference between the molecular weights of the two wax components in an embodiment is sufficiently large that the migration rates to the adhesive surface are different. In alternative embodiments, the first wax component is not functionalized, the second wax component is not functionalized, the first wax component is functionalized, the second wax component is functionalized, and both the first and second wax components are functionalized.

In embodiments, the difference between the weight average molecular weight of the first wax component ($Mw_{wax1}$) and the weight average molecular weight of the second wax component ($Mw_{wax2}$) is at least about 1000 g/mole, at least about 2000 g/mole, at least about 3000 g/mole, at least about 4000 g/mole, at least about 5000 g/mole, at least about 6000 g/mole, at least about 7000 g/mole, at least about 8000 g/mole, at least about 9000 g/mole, or at least about 10,000 g/mole.

In embodiments, $Mw_{wax1}$ is less than about 4000 g/mole, from about 450 to 4000 g/mole, from about 500 to 4000 g/mole, from about 1000 to about 3500 g/mole, from about 1500 to 3500 g/mole, from about 2000 to 3500 g/mole or from 2500 to 3500 g/mole. In other embodiments, $Mw_{wax2}$ is above about 5000 g/mole, from about 5000 to 20,000 g/mole, from about 6000 to 18000 g/mole, or from about 8000 to about 16000 g/mole.

In one embodiment, the difference between the Brookfield viscosity at 190° C. of the first wax component and the Brookfield viscosity at 190° C. of the second wax component is at least about 70 mPa·s, at least about 80 mPa·s, at least about 90 mPa·s, or at least about 100 mPa·s. In an embodiment, the Brookfield viscosity of the first wax component at 190° C. is from about 100 mPa·s or less, from about 60 to 100 mPa·s, or from about 60 to about 90 mPa·s. In another embodiment, the Brookfield viscosity of the second wax component at 190° C. is from about 190 mPa·s or more, from 190 to 10,000 mPa·s, from 200 to 5,000 mPa·s, or from 200 to 1000 mPa·s.

In one embodiment, a weight ratio of the first wax component to the second wax component is within a range from about 10:90 to about 90:10, from about 25:75 to about 75:25, from about 40:60 to about 60:40, from about 45:55 to about 55:45, or about 50:50. In one embodiment, the proportions of the first and second wax components are selected depending on the desirability of the property being enhanced because of the base polymer properties or the packaging application: for example, if the set time is more important, a relatively greater proportion of the low molecular weight wax component can be used, or if the adhesion is more important relatively more of the high molecular weight can be used.

Another embodiment disclosed herein, is directed to an adhesive, alternatively or in addition to having one or more of the characteristics of the adhesive composition summarized above, comprising a polyolefin base polymer and from 1 to 15 wt % of said at least two wax components, based on the total weight of the polyolefin base polymer and at least two wax components, wherein the at least two components comprise at least one wax component that has a weight average molecular weight at least 8% (preferably at least 10%, preferably at least 15%, preferably at least 20%) of the weight average molecular weight of the polyolefin base polymer and a crystallization temperature greater than that of the polyolefin base polymer and greater than 100° C., whereby the wax component increases the crystallization temperature of the polyolefin base polymer in the adhesive mixture as determined by differential scanning calorimetry. In an embodiment, the adhesive composition comprises from 1 to 10 wt % of at least one functionalized polyolefin, and in another embodiment the polyolefin base polymer is alternatively or additionally functionalized. In an embodiment the adhesive has the following properties:
(a) at least 5% (preferably at least 10%, preferably at least 20%, preferably at least 30%) fiber tear at 2° C. using Inland paper board as a substrate;
(b) at least 50% (preferably at least 60%, preferably at least 70%, preferably at least 80%) fiber tear at 25° C. using Inland paper board as a substrate; and
(c) a set time of less than 3 seconds (preferably between 0.5 and 2 seconds).

Nonlimiting examples of waxes, which can be employed as either or both of the relatively low molecular weight first wax component and the relatively high molecular weight second wax component, include petroleum based and synthetic waxes. Waxes suitable for use in the present invention include paraffin waxes, microcrystalline waxes, polyethylene waxes, polypropylene waxes, by-product polyethylene waxes, Fischer-Tropsch waxes, oxidized Fischer-Tropsch waxes and functionalized waxes such as hydroxy stearamide waxes and fatty amide waxes and combinations of thereof. In embodiments, the wax components may be of the same or different types of waxes, and may be miscible or immiscible. It is common in the art to use the terminology synthetic high melting point waxes to include high density low molecular weight polyethylene waxes, by-product polyethylene waxes and Fischer-Tropsch waxes, which are useful herein.

Modified waxes, such as vinyl acetate modified, maleic anhydride modified, oxidized waxes and other polar waxes may also be used in an embodiment as previously mentioned. In one embodiment the functionalized wax component is a single component but serves a dual function as both the functionalized polyolefin component and one or more of the wax components. In another embodiment the adhesive is essentially free of modified waxes, i.e., it is free of deliberately added modified waxes or contains less than 1 wt % of modified waxes. In an embodiment, the wax component comprises less than 2 wt % or less than 1 wt % modified waxes by weight of the total wax components.

Preferably, the wax components are paraffin waxes, microcrystalline waxes, Fischer-Tropsch synthetic waxes, and polyethylene waxes, all of which are a blend of linear and branched hydrocarbons. Paraffin waxes are complex mixtures of many substances. They mainly consist of saturated hydrocarbons.

Microcrystalline waxes are a type of wax produced by dewaxing petrolatum, as part of the petroleum refining process. Microcrystalline wax contains a higher percentage of isoparaffinic (branched) hydrocarbons and naphthenic hydrocarbons as compared with paraffin wax. It is characterized by the fineness of its crystals in contrast to the larger crystal of paraffin wax. It consists of high molecular weight saturated aliphatic hydrocarbons, and has a high melting point. Typical microcrystalline wax crystal structure is small and thin, making the wax crystals relatively more flexible than paraffin wax crystals.

Polyolefin waxes typically have a weight average molecular weight of from 500 to 20,000 g/mol and can be produced by thermal degradation of high molecular weight branched polyolefin polymers or by direct polymerization of olefins. In other embodiments, the first wax component has a weight average molecular weight of from 1,000 to 10,000, from 2,000 to 10,000, from 3,000 to 10,000, from 4,000 to 10,000, from 5,000 to 10,000, from 6,000 to 10,000, from 7,000 to 10,000, from 8,000 to 10,000, and from 9,000 to 10,000; and the second wax component has a weight average molecular weight of from 1,000 to 20,000, from 2,000 to 20,000, from 3,000 to 20,000, from 4,000 to 20,000, from 5,000 to 20,000, from 6,000 to 20,000, from 7,000 to 20,000, from 8,000 to 20,000, from 9,000 to 20,000, from 10,000 to 20,000, and from 15,000 to 20,000. Suitable polymerization processes include, for example, high-pressure technologies, in which the olefins, generally ethylene, are reacted free-radically under high pressures and temperatures to form branched waxes, and also low-pressure or Ziegler processes, in which ethylene and/or higher 1-olefins are polymerized using organometallic catalysts. Polyethylene waxes produced using metallocene catalyst have a narrower molecular weight distribution, more uniform incorporation of comonomer, and lower melting points, in comparison to the Ziegler-Natta technology. In one embodiment, the high molecular weight second wax component comprises a metallocene polyethylene wax.

In an embodiment, the polyethylene wax has an Mw of from about 2,000 to about 20,000 g/mol, a molecular weight distribution Mw/Mn, which is also referred to as the polydispersity index, of from about 2 to 10, a viscosity at 190° C. of from 50 to 1000 mPa·s, a melting temperature range of from about 120 to 131° C. for a homopolymer and from about 100 to 126° C. for a copolymer, and a density of from 0.90 to 0.97 g/cm$^3$. Low molecular weight polyethylene waxes are commercially available under the trade designations LICOWAX and LICOCENE from Clariant, PETROLITE C-4040 and POLYWAX1000, 2000, and 3000 from Baker Petrolite Corporation (Sugarland, Tex.); low molecular weight by-product polyethylene waxes under the trade designation MARCUS 100, 200 and 300, from Marcus Chemical Co., a Division of H.R.D. Corp. (Houston, Tex.); are also available commercially from Honeywell Corporation, or Eastman Corporation.

Fischer-Tropsch waxes can be produced by Fischer-Tropsch synthesis including e.g., a catalyzed chemical reaction in which a mixture of carbon monoxide and hydrogen synthesis gas is converted into liquid hydrocarbons of various lengths. Fischer-Tropsch waxes are commercially available, for example, under the trade designations PARAFLINT H-1, H-4 and H-8 from Sasol-SA/Moore & Munger (Shelton, Conn.), and BARECO PX-105, from Baker Petrolite Corporation (Sugar land, Tex.).

In some embodiments, the wax components have a mettler drop point of 110° C. or more, as determined by ASTM D3954, a congealing point of 110° C. or more, as determined by ASTM D938, or a melting temperature of 110° C. or more, as determined by ASTM D3418-03.

The polyolefin waxes present in an embodiment of the hot melt compositions of the invention preferably have a ring & ball softening point of between 90° C. and 160° C., and a viscosity at 170° C. of between 50 and 30,000 mPa·s.

In an embodiment, the at least two wax components may be blended to form a wax blend wherein the wax blend has a viscosity at 140° C. of between about 100 mPa·s and about 10,000 mPa·s and softening point defined by one or more of the following: Mettler drop point as determined by ASTM-D3954-94 greater than 110° C.; congealing point as determined by ASTM D-938 greater than 110° C.; ring and ball softening point as determined by ASTM E-28 greater than 110° C.; or peak melt temperature as determined by DSC greater than 110° C. In an embodiment, the composition has a characteristic set time equal to or less than 3 seconds as determined by the equation set time=$5.26-6.9\times10^{-5}$*[wax blend viscosity at 140° C., (mPa·s)]$-0.021$*[wax blend ring and ball softening point, (° C.)], wherein the ring and ball wax softening point is as just defined.

One or both of the wax components in one embodiment have a crystallization temperature of 90° C. or more, preferably 100° C. or more, and more preferably 110° C. or more. In another embodiment, the crystallization temperature of the wax component(s) is higher than that of the base polymer. A high crystallization temperature relative to that of the neat base polymer can facilitate earlier crystallization of the base polymer upon rapid cooling from the melt. The wax component(s) preferably increases the crystallization temperature of the base polymer in the melt of adhesive relative to the neat base polymer by itself, for example, by providing nucleation sites for copolymer crystallization. The crystallization temperature of the wax components and base polymer can be determined either neat or in a blend by differential scanning calorimetry (DSC), according to ASTM D3418-03. The crystallization curve of the base polymer shifts when the DSC data are collected for the adhesive blend containing a small amount of the high-crystallization-temperature wax component(s), i.e. the base polymer crystallizes from the melt of adhesive at a higher temperature than the neat base polymer.

According to an embodiment of the invention, the adhesive composition exhibits at least two peaks when subjected to DSC cooling, with a first (highest) crystallization point (Tc) of at least 90° C., corresponding to a crystallization of the high-crystallization-temperature wax component(s), and at least a second crystallization point of at least 40° C. The difference between the first and second crystallization temperatures in one embodiment is at least 20° C. All the crystallization temperatures are determined using the same DSC procedure according to ASTM D 3418-03.

In an embodiment, the high-crystallization-temperature wax component(s) is the first ingredient to solidify as the molten adhesive cools. The order of crystallization among the components in the adhesive upon cooling can be determined using DSC. In one embodiment, there exists a crystallization peak in a DSC trace where the first crystallization temperature is about the same as the crystallization temperature of the neat high-crystallization-temperature wax component(s), e.g. within 5° C. or 10° C., and the second crystallization temperature (corresponding to a base polymer component) is higher than that of the neat base polymer by at least 5° C. or 10° C. or more.

In one embodiment, the difference between the melting and crystallization peak temperatures (Tm–Tc) of the adhesive composition, i.e., the supercooling range, is less than 40° C., preferably less than 30° C., more preferably less than 20° C. Where there are multiple crystallization peaks in the adhesive composition, the highest peak crystallization temperature is used for the supercooling calculation.

In another embodiment, the adhesive comprises a wax component(s) that has a molecular weight at least 8% of the molecular weight of the base copolymer. The wax component(s) has a molecular weight that is sufficient to inhibit migration to the interface of the adhesive with the substrate, which can weaken the interfacial bonding. Preferably, the weight average molecular weight of the wax is 3000 g/mol or more.

The viscosity ratio of one or both of the wax components to the base copolymer is important in one embodiment to promote wax dispersion in the base polymer and uniform crystallite distribution that can affect the set time of the adhesive. In an embodiment, the ratio of the weight average molecular weight of the wax component(s) to that of the base copolymer is at least 0.08, preferably at least 0.10, preferably at least 0.15, preferably at least 0.20, preferably at least 0.3, preferably at least 0.4, preferably at least 0.5. In another embodiment, ratio of the weight average molecular weight of the wax component(s) to that of the base copolymer is 1.5 or less, 1.25 or less, 1.0 or less, 0.8, or less, 0.6 or less, 0.4 or less, 0.20 or less, 0.15 or less, and 0.10 or less. In still another embodiment, the range of ratios of the weight average molecular weight of the wax component(s) to that of the base copolymer is from 0.15 to 1.5, 0.15 to 0.5. In an embodiment, the neat wax has a viscosity at 190° C. of at least 50 mPa·s, preferably at least 100 mPa·s. In one embodiment, the wax component(s) has a viscosity at 190° C. of no more than 3000 mPa·s, preferably no more than 2000 mPa·s, even more preferably no more than 1000 mPa·s. In a preferred embodiment, the high molecular weight second wax component has a unique characteristic of relatively high viscosity combined with relatively high crystallinity, for example, the viscosity at 190° C. is 190 mPa·s or more and Tc is 100° C. or more, such as 105° C. or more; 110° C. or more; and 115° C. or more.

In embodiments, a ratio of the weight average molecular weight of at least the second wax component ($Mw_{wax2}$) to the weight average molecular weight of the polyolefin base polymer ($Mw_{polymer}$) is at least about 0.08 or at least about 0.15, and in particular embodiments, $0.08 \leq (Mw_{wax2}/Mw_{polymer}) \leq 1.5$; $0.15 \leq (Mw_{wax2}/Mw_{polymer}) \leq 1.5$; $0.08 \leq (Mw_{wax2}/Mw_{polymer}) \leq 0.25$; or $0.10 \leq (Mw_{wax2}/Mw_{polymer}) \leq 0.20$. In an embodiment, the crystallization temperature of the second wax component may be higher than the crystallization temperature of the polymer, as determined by differential scanning calorimetry (DSC) according to ASTM D3418-03, such that the second wax component solidifies first and acts as a nucleating agent for the polyolefin base polymer in the composition.

In another embodiment, the inventive hot melt adhesives comprise at least one polypropylene wax. Polypropylene waxes include both homo-polypropylenes and propylene copolymers. Preferably, the polypropylene wax has a ring & ball softening point of between 80° C. and 165° C., a peak melting temperature of from 80° C. to 165° C. as determined by DSC according to ASTM D3814-03, a Brookfield viscosity, measured at a temperature of 170° C., of between 20 and 40,000 mPa·s.

In addition, tackifiers may be used in an embodiment of the adhesives of this invention. Examples of suitable tackifiers, include, but are not limited to, aliphatic hydrocarbon resins, aromatic modified aliphatic hydrocarbon resins, hydrogenated polycyclopentadiene resins, polycyclopentadiene resins, gum rosins, gum rosin esters, wood rosins, wood rosin esters, tall oil rosins, tall oil rosin esters, polyterpenes, aromatic modified polyterpenes, terpene phenolics, aromatic modified hydrogenated polycyclopentadiene resins, hydrogenated aliphatic resin, hydrogenated aliphatic aromatic resins, hydrogenated terpenes and modified terpenes, hydrogenated rosin acids, and hydrogenated rosin esters. In some embodiments the tackifier is hydrogenated.

In other embodiments the tackifier is non-polar, by which is meant that the tackifier is substantially free of monomers having polar groups. Preferably the polar groups are not present, however if present, they comprise not more than 5 wt %, preferably not more than 2 wt %, even more preferably no more than 0.5 wt %, of the tackifier. In some embodiments the tackifier has a softening point (Ring and Ball, as measured by ASTM E-28) of 80° C. to 150° C., preferably 100° C. to 130° C. In another embodiment the resin is liquid and has a ring and ball softening point of between 10° C. and 70° C.

The tackifier, if present, is typically present at about 1 to about 15 wt %, such as about 2 to about 10 wt %, for example about 3 to about 5 wt %, based upon the weight of the adhesive blend.

Preferred hydrocarbon resins for use as tackifiers or modifiers include:

(a) Resins such as C5/C6 terpene resins, styrene terpenes, alpha-methyl styrene terpene resins, C9 terpene resins, aromatic modified C5/C6, aromatic modified cyclic resins, aromatic modified dicyclopentadiene based resins or mixtures thereof. Additional preferred resins include those described in WO 91/07472, U.S. Pat. Nos. 5,571,867, 5,171,793 and 4,078,132. Typically these resins are obtained from the cationic polymerization of compositions containing one or more of the following monomers: C5 diolefins (such as 1-3 pentadiene, isoprene, etc); C5 olefins (such as 2-methylbutenes, cyclopentene, etc.); C6 olefins (such as hexene), C9 vinylaromatics (such as styrene, alpha methyl styrene, vinyltoluene, indene, methyl indene, etc.); cyclics (such as dicyclopentadiene, methyldicyclopentadiene, etc.); and or terpenes (such as limonene, carene, etc).

(b) Resins obtained by the thermal polymerization of dicyclopentadiene, and/or the thermal polymerization of dimers or oligomers of cyclopentadiene and/or methyl-cyclopentadiene, optionally with vinylaromatics (such as styrene, alpha-methyl styrene, vinyl toluene, indene, methyl indene).

Suitable commercially available tackifiers include ESCOREZ® 1000, 2000 and 5000 series hydrocarbon resins, ECR-373, OPPERA™ PR 100, 101, 102, 103, 104, 105, 106, 111, 112, 115, and 120, available from ExxonMobil Chemical Company, ARKON™ M series, ARKON P series and SUPER ESTER™ rosin esters available from Arakawa Chemical Company of Japan, SYLVARES™ phenol modified styrene-α methyl styrene resins, styrenated terpene resins, ZONATAC terpene-aromatic resins, and terpene phenolic resins available from Arizona Chemical Company of Jacksonville, Fla., SYLVATAC™ and SYLVALITE™ rosin esters available from Arizona Chemical Company, NORSOLENE™ aliphatic aromatic resins available from Cray Valley of France, DERTOPHENE™ terpene phenolic resins available from DRT Chemical Company of Landes, France, EASTOTAC™ resins, PICCOTAC™ C5/C9 resins, REGALITE™ and REGALREZ™ aromatic and REGALITE™ cycloaliphatic/aromatic resins available from Eastman Chemical Company of Kingsport, Term., WINGTACKT™ resins available from Goodyear Chemical Company of Akron, Ohio, FORAL™, PENTALYN™, AND PERMALYN™ rosins and rosin esters available from Eastman Chemical Company, QUINTONE™ acid modified C5 resins, C5/C9 resins, and acid modified C5/C9 resins available from Nippon Zeon of Japan, and LX™ mixed aromatic/cycloaliphatic resins available from Neville Chemical Company of Pittsburgh, Pa., CLEARON hydrogenated terpene aromatic resins available from Yasuhara Chemical of Japan. The preceding examples are illustrative only and by no means limiting.

In one embodiment, the adhesive composition is essentially free of added tackifier, e.g. the adhesive composition contains less than 0.1 wt % tackifier.

In yet another aspect, the adhesive can include 15% by weight or less, or 10% by weight or less, or 5% by weight or less of one or more additives selected from plasticizers, oils, stabilizers, antioxidants, pigments, dyestuffs, antiblock additives, polymeric additives, defoamers, preservatives, thickeners, adhesion promoters, rheology modifiers, humectants, fillers, surfactants, processing aids, cross-linking agents, neutralizing agents, flame retardants, fluorescing agents, compatibilizers, antimicrobial agents, nucleating agent and water.

Exemplary oils may include aliphatic naphthenic oils, white oils, and combinations thereof, for example. The phthalates may include di-iso-undecyl phthalate (DIUP), di-isononylphthalate (DINP), dioctylphthalates (DOP), combinations thereof, or derivatives thereof. Exemplary polymeric additives include homo poly-alpha-olefins, copolymers of alpha-olefins, copolymers and terpolymers of diolefins, elastomers, polyesters, block copolymers including diblocks and triblocks, ester polymers, alkyl acrylate polymers, and acrylate polymers. Exemplary plasticizers may include mineral oils, polybutenes, phthalates, and combinations thereof.

Exemplary anti-oxidants include alkylated phenols, hindered phenols, and phenol derivatives, such as t-butyl hydroquinone, butylated hydroxyanisole, polybutylated bisphenol, butylated hydroxy toluene (BHT), alkylated hydroquinone, 2,6-di-tert-butyl-paracresol, 2,5-di-tert-aryl hydroquinone, octadecyl-3-(3,5-di-tert-butyl-4-hydroxy phenyl), tetrakis-(methylene-(3,5-di-(tert)-butyl-4-hydrocinnamate)) methane (IRGANOX 1010), etc. Examples of hindered phenolic antioxidants are commercially available under the IRGANOX series of trade designations including IRGANOX 565, IRGANOX 1010 and IRGANOX 1076 from Ciba Specialty Chemicals (Basel, Switzerland). In one embodiment, the adhesive composition comprises from 0.01 to 3 wt % of an antioxidant, preferably from 0.05 to 2 wt %.

Exemplary fillers include silica, diatomaceous earth, calcium carbonate, iron oxide, hydrogenated castor oil, fumed silica, precipitated calcium carbonate, hydrophobic treated fumed silicas, hydrophobic precipitated calcium carbonates, talc, zinc oxides, polyvinyl chloride powders, fungicides, graphite, carbon black, asphalt, carbon fillers, clay, mica, fibers, titanium dioxide, cadmium sulfide, asbestos, wood fluor, polyethylene powder, chopped fibers, bubbles, beads, thixotropes, bentonite, calcium sulfate, calcium oxide, magnesium oxide, and combinations or derivates thereof. Exemplary surfactants include vinyl-containing or mercapto-containing polyorganosiloxanes, macromonomers with vinyl terminated polydimethyl siloxane, and combinations or derivatives thereof.

Exemplary adhesion promoters include silanes, titanates, organosylane, acrylics, acids, anhydrides, epoxy resins, hardening agents, polyamides, methylacrylates, epoxies, phenolic resins, polyisobutylene, aminoalkyl, mercaptoalkyl, epoxyalkyl, ureidoalkyl, carboxy, acrylate and isocyanurate functional silanes, mercaptopropyltrimethoxysilane, glycidoxpropyltrimethoxysilane, aminopropyltriethoxysilane, amino ethylaminopropyltrimethoxysilane, ureidopropyltrimethyloxysilane, bis-gamma-trimethoxysilyl-propylurea, 1,3,5-tris-gamma-trimethoxysilylpropylisocyanurate, bis-gamma-trimethoxysilylpropylmaleate, fumarate and gamma-methacryloxypropyltrimethoxysilane, aminopropyltriethoxysilane, and combinations and derivatives thereof. Exemplary crosslinking agents include oxime crosslinkers, alkoxysilanes, epoxyalkylalkoxysilanes, amido silanes, amino silanes, enoxysilanes, tetraethoxysilanes, methyltrimethoxy silane, vinyl trimethoxysilane, glycidoxypropyltrimethoxsilane, vinyl tris-isopropenoxysilane, methyl tris-isopropenoxysilane, methyl tris-cyclohexylaminosilane, methyl tris-secondarybutylaminosilane, polyisocyanates, and combinations or derivatives thereof. Exemplary organic solvents include aliphatic solvents, cycloaliphatic solvents, mineral spirits, aromatic solvents, hexane, cyclohexane, benzene, toluene, xylene, and combinations or derivatives thereof.

Exemplary stabilizers include hindered phenols, sulfur phenols, phosphorous-containing phenols, 1,3,5-trimethyl-2,4,6-tris(3-5-di-tert-butyl-4-hydroxybenzyl)benzene, pentaerythritol tetrakis-3 (3,5-di-tert-butyl-4-hydroxyphenyl) propionate, n-octadecyl-3(3,5-di-tert-butyl-4-hydroxyphenyl) propionate, 4,4'-methylenebis(4-methyl-6-tert butylphenol), 4,4'-thiobis(6-tertbutyl-o-cresol), 2,6-di-tert-butylphenol, 6-(4-hydroxyphenoxy)-2,4-bis(n-octylthio)-1,3,5-triazine, 2,4,6-tris(4-hydroxy-3,5-di-tert-butyl-phenoxy)-1,3,5-triazine, di-n-octadecyl-3,5-di-tert-butyl-4-hydroxybenzylphosphonate, 2-(n-octylthio)ethyl-3,5-di-tert-butyl-4-hydroxybenzoate, sorbitol hexa-(3,3,5-di-tertbutyl-4-hydroxy-phenyl) propionate, and combinations or derivatives thereof. In one aspect, the adhesive composition includes from 0.01 to 3 percent by weight of the one or more stabilizers.

In one embodiment, the adhesives comprise a nucleating agent, preferably present at 50 to 4000 ppm based on total weight of the adhesive composition. Exemplary nucleating agents include: HYPERFORM (e.g. HPN-68 and MILLAD additives (e.g., MILLAD 3988) from Milliken Chemicals, Spartanburg, S.C. and organophosphates such as, for example, NA-11 and NA-21 from Amfine Chemicals, Allendale, N.J. In another embodiment, the wax is the only nucleating agent present in the adhesive blend.

Preferably, the peak melting temperature of the adhesive composition is 120° C. or less, preferably 110° C. or less. Low melting temperature allows the adhesives to be applied at low application temperature. In one embodiment, the adhesive is a low application temperature hot melt adhesive, i.e., an adhesive that can be applied to a substrate surface at a temperature of less than 150° C. (302° F.) and then used to bond the substrate to a second substrate surface. Such adhesives do not require heating to temperatures greater than 150° C. (302° F.) to sufficiently reduce viscosity for application.

In an embodiment, the low application temperature adhesives comprise a propylene copolymer with a melting temperature of 105° C. or less, a functionalized propylene polymer and a wax component.

Adhesive compositions containing the copolymers according to one embodiment exhibit a novel and advantageous balance of properties including: at least 20% fiber tear at −18° C., and at least 50% fiber tear at 25° C. using Inland paper board as a substrate, a set time of less than 2 seconds, a viscosity of less than 50,000 mPa·s at 190° C. and a toughness of greater than 3.4 megajoule/m$^3$ when the viscosity at 190° C. is less than 1000 mPa·s; a toughness of greater than 7 megajoule/m$^3$ and an elongation of 100% or more when viscosity at 190° C. is in a range from 1000 to 10,000 mPa·s; and a toughness of greater than 14 megajoule/m$^3$ and an elongation of 400% or more when the viscosity at 190° C. is greater than 10,000 mPa·s.

In preferred embodiments, the adhesive compositions have a Shear Adhesion Fail Temperature (SAFT) of at least 100° C., a viscosity of less than 25,000 mPa·s, such as less than 10,000 mPa·s, for example less than 5,000 mPa·s, typically less than 1,000 mPa·s at 190° C., and a set time of less than 2 seconds.

In other embodiments, the adhesive compositions have a Dot T-Peel adhesion of at least 8 newtons for adhesion between a fiber board and a fabric substrate at room temperature (25° C.) and a Dot T-Peel adhesion of at least 8 newtons for adhesion between two polyethylene terephthalate (PET) films at room temperature (25° C.) and at 40° C.

In order to measure set time, Dot T-Peel and substrate fiber tear, adhesive test specimens are created by bonding the substrates together with a dot of about 0.3 grams of molten adhesive and compressing the bond with a 500-gram weight. The dot size is controlled by the adhesive volume such that the compressed disk which forms gives a uniform circle just inside the dimensions of the substrates.

Once a construct is produced it can be subjected to various insults to assess the effectiveness of the bond. Once a bond to a substrate fails a simple way to quantify the effectiveness of the adhesive is to estimate the area of the adhesive dot that retained substrate fibers as the construct failed along the bond line. This estimate is called percent substrate fiber tear. An example of good adhesion, after conditioning a sample for 15 hours at −12° C. and attempting to destroy the bond, would be an estimate of 80-100% substrate fiber tear. It is likely that 0% substrate fiber tear under those conditions would signal a loss of adhesion.

The specimens for substrate fiber tear testing are prepared using the same procedure as that described above. For low temperature fiber tear test, the bond specimens are placed in a freezer or refrigerator to obtain the desired test temperature. For substrate fiber tear at room temperature, the specimens are aged at ambient conditions. The bonds are separated by hand and a determination made as to the type of failure observed. The amount of substrate fiber tear is expressed herein as a percentage. All the fiber tear tests are conducted using Inland paper board as the substrate. Inland Paper Board is a high performance box board obtained from Inland Paper Board and Packaging Company of Rome, Ga. It is characterized as a #56 virgin high performance paper board stock.

Set time (also referred to as characteristic set time or dot set time) is defined as the time it takes for a compressed adhesive substrate construct to fasten together enough to give substrate fiber tear when pulled apart, and thus the bond is sufficiently strong to remove the compression. These set times are measured by trial and error by placing a molten dot of adhesive on to a file folder substrate taped to a flat table. Three seconds later, a file folder tab (2.5 cm×7.6 cm (1 inch by 3 inch)) is placed upon the dot and compressed with a 500-gram weight. The weight is allowed to sit for a predetermined time period from about 0.5 to about 10 seconds. The construct thus formed is pulled apart to check for a bonding level good enough to produce substrate fiber tear. The procedure is repeated several instances while holding the compression for different periods, and the set time is recorded as the minimum time required for this good bonding to occur. Standards are used to calibrate the process.

Dot T-Peel is determined according to ASTM D 1876, except that the specimen is produced by combining two 2.54 cm×7.62 cm (1 inch by 3 inch) substrate cut outs with a dot of adhesive with a volume that, when compressed under a 500 gram weight occupies about 6.45 cm² of area (1 square inch). Once made, all the specimens are pulled apart in side-by-side testing at a rate of 5.1 cm (2 in.) per minute by a machine (such as an Instron) that records the destructive force of the insult being applied. The maximum force achieved for each sample tested is recorded and averaged, thus producing the average maximum force, which is reported as the Dot T-Peel.

Peel Strength (modified ASTM D1876): Substrates measuring 25×76 mm (1×3 inches) are heat sealed with 130 μm (5 mil) adhesive film at 135° C. for 1 to 2 seconds and 0.28 MPa (40 psi) pressure. Bond specimens are peeled back in a tensile tester at a constant crosshead speed of 51 mm/min (2 in./min). The average force required to peel the bond (5 specimens) apart is recorded.

Open time is determined according to ASTM D4497.

Shore A hardness is measured according to ASTM 2240. An air cooled dot of adhesive was subjected to the needle and the deflection was recorded from the scale.

Adhesive melt viscosity and viscosity profiles vs. temperature are measured using a Brookfield digital viscometer and a number 27 spindle according to ASTM D-3236.

SAFT (modified ASTM D 4498-00) measures the ability of a bond to withstand an elevated temperature rising at 5.5° C. (10° F.)/15 min., under a constant force that pulls the bond in the shear mode. Bonds are formed in the manner described above on Kraft paper (2.5 cm×7.6 cm (1 inch by 3 inch)). The test specimens are suspended vertically in an oven at room temperature with a 500-gram load attached to the bottom. The temperatures at which the weight falls is recorded (when the occasional sample reaches temperatures above the oven capacity>129° C. (265° F.) it is terminated and averaged in with the other samples at termination temperature).

Peel Adhesion Failure Temperature (PAFT) is determined using the following procedure modified according to the procedure of TAPPI T814 PM-77. Two sheets of 15.2 cm by 30.5 cm (6"×12") Kraft paper are laminated together with a 25 mm (one inch) strip of molten adhesive heated to 177° C. The laminated sheet is trimmed and cut into 25 mm (f-inch) wide strips. These strips are placed in an oven with a 100-gram of weight hanging in a peel mode. The oven temperature is increased at a rate of 30° C. per hour. The samples are hung from a switch that trips when the samples fail to record the temperature of failure.

Cloud point is determined by heating the adhesive blends to 121° C. and applying a small bead (approximately 1 gram) of the molten adhesive to the bulb of an ASTM thermometer. The temperature at which the molten adhesive clouds over is then noted. These measures of cloud point provide an indication of a hot melt's overall compatibility, i.e., the compatibility of the individual ingredients with each other.

Heat resistance (or heat stress) measures the temperature at which the adhesive starts to fail. Hot melt adhesives generally need heat resistance of 54° C. (130° F.) or above such that sealed cases, cartons or trays will not have heat related failure in summer time during transportation or warehouse storage. The Institute of Packaging Professionals (IOPP) heat stress test is used to measure the resistance of an adhesive to bond failure at elevated temperatures. The procedure is described in the *IOPP Technical Journal*, Winter 1992, pages 7-9. The IOPP test is reported as the highest temperature at which the adhesive passes, or the temperature at which a majority of repeated testing passes, e.g. at least 4 passes out of 5. The inventive hot melt adhesive compositions in one embodiment have IOPP heat resistance (4 passes out of 5) of 54° C. or more, preferably 60° C. or more, more preferably 70° C. or more.

Stress-strain properties for the neat base polymer and HMA composition were determined according to ASTM D 1708. The specimens were prepared using compression molded plaques. Tensile properties were measured on an Instron™ model 4502 equipped with a 22.48 lb. load cell and pneumatic jaws fitted with serrated grip faces. Deformation was performed at a constant crosshead speed of 5.0 in/min with a data sampling rate of 25 points/second. Initial modulus, stress and strain at yield (where evident), peak stress, tensile strength at break, and strain at break were calculated. A minimum of five specimens from each plaque was tested, the results being reported as the average value. All stresses quoted were calculated based upon the original cross-sectional area of the specimen, taking no account of reduced cross-section as a function of increasing strain. Tensile strength is defined as the maximum tensile stress. Tensile strength is also called as ultimate strength. Toughness is defined as the ability of polymer to absorb applied energy before breaking. The area under the stress-strain curve is used as a measure of the toughness.

Creep resistance is determined according to ASTM D-2293

Density is determined according to ASTM D792 at 25° C.

In one embodiment, the individual components in the hot melt adhesive composition are immiscible so that the composition has a heterogeneous morphology. By heterogeneous blend is meant a composition having two or more morphological phases in the same state. For example a blend of two polymers where one polymer forms discrete packets dispersed in a matrix of another polymer is said to be heterogeneous in the solid state. Also heterogeneous blend is defined to include co-continuous blends where the blend components are separately visible, but it is unclear which is the continuous phase and which is the discontinuous phase. Such morphology is determined using scanning electron microscopy (SEM) or atomic force microscopy (AFM), in the event the SEM and AFM provide different data, then the SEM shall be used. By continuous phase is meant the matrix phase in a heterogeneous blend. By discontinuous phase is meant the dispersed phase in a heterogeneous blend. One advantageous heterogeneous blend comprises the lower crystallinity base polymer component in the continuous phase and the higher crystallinity wax in the dispersed phase. The sizes of the individual domains of the dispersed phase are very small with the smallest length dimension for the dispersed phase typically being less than 2 µm, such as less than 1 µm. Preferably the dispersed phase has a uniform distribution in the continuous phase. While not wishing to be restrained by any theory, we believe that the dispersed wax particles act like a nucleating site and these nucleating sites enhance the crystallization of the adhesive mixture during the solidifying process, thereby reducing the set time and improving green strength. Morphology of the adhesive composition can be examined using Atomic Force Microscopy (AFM) or Transmission Electron Microscopy (TEM).

The color of polymers and their blends is measured using Gardner index (Gardner color scale) according to ASTM D 1544-04. Gardner Delta 212 color comparator is used. The samples are melted at a set temperature and aged for a specified period of time prior to measurement.

The adhesives of this invention can be used in any adhesive application, including but not limited to, disposables, packaging, laminates, pressure sensitive adhesives, tapes, labels, wood binding, paper binding, non-wovens, road marking, reflective coatings, and the like.

The adhesives described above may be applied to any substrate. Preferred substrates include wood, paper, cardboard, plastic, thermoplastic, rubber, metal, metal foil (such as aluminum foil and tin foil), metallized surfaces, cloth, non-wovens (particularly polypropylene spun bonded fibers or non-wovens), spunbonded fibers, cardboard, stone, plaster, glass (including silicon oxide ($SiO_x$) coatings applied by evaporating silicon oxide onto a film surface), foam, rock, ceramics, films, polymer foams (such as polyurethane foam), substrates coated with inks, dyes, pigments, PVDC and the like or combinations thereof.

Additional preferred substrates include polyethylene, polypropylene, polyacrylates, acrylics, polyethylene terephthalate, or any of the polymers listed above as suitable for blends. Any of the above substrates, and/or the polymers of this invention, may be corona discharge treated, flame treated, electron beam irradiated, gamma irradiated, microwaved, or silanized.

In a particular embodiment, the adhesives of this invention can be used in a packaging article. The packaging article may be useful as a carton, container, crate, case, corrugated case, or tray, for example. More particularly, the packaging article may be useful as a cereal product, cracker product, beer packaging, frozen food product, paper bag, drinking cup, milk carton, juice carton, drinking cup, or as a container for shipping produce, just to name a few exemplary uses.

The packaging article is formed by applying an adhesive composition to at least a portion of one or more packaging elements. The packaging elements may be formed from paper, paperboard, containerboard, tagboard, corrugated board, chipboard, kraft, cardboard, fiberboard, plastic resin, metal, metal alloys, foil, film, plastic film, laminates, sheeting, or any combination thereof. In one aspect, the adhesive composition may be used to bind or bond two or more packaging elements together wherein the packaging elements are formed from the same or different type of materials. Accordingly, the packaging elements may be individually formed from paper, paperboard, containerboard, tagboard, corrugated board, chipboard, kraft, cardboard, fiberboard, plastic resin, metal, metal alloys, foil, film, plastic film, laminates, sheeting, or any combination thereof. The one or more packaging elements may also be individually coated using paper, foil, metal, metal alloys, polyethylene, polypropylene, polyester, polyethylene terephthalate, polyvinyl chloride, polyvinylidine chloride, polyvinyl acetate, polyamides, homopolymers thereof, and combinations and copolymers thereof.

When used in a packaging adhesive application, in an embodiment the present propylene copolymer typically has a viscosity of less than 1500 mPa·s at 190° C. as measured using Brookfield digital viscometer; a tensile strength of at least 1.38 MPa (200 psi), preferably at least 2.76 MPa (400 psi), more preferably at least 4.14 MPa (600 psi); an elongation of at least 30%, preferably at least 80%, more preferably at least 120%; and a toughness of 3.4 megajoule/$m^3$ or more.

The adhesive composition may also be formulated in an embodiment to have a viscosity of less than 1000 mPa·s at 190° C.; a tensile strength of at least 2 MPa (300 psi), preferably at least 3.4 MPa (500 psi), more preferably at least 4.8 MPa (700 psi); and an elongation of at least 30%, preferably at least 80%, more preferably at least 120%.

The adhesive composition may also be formulated in an embodiment to have fiber tear of greater than 80% at room temperature, and have fiber tear of greater than 80% at −18° C., and have fiber tear of greater than 80% at 20° C. The adhesive composition is also formulated to have a set time of less than 2 seconds, preferably from 1 to 2 seconds.

The formulated adhesive composition in an embodiment may also has a PAFT of at least 60° C., preferably at least of 80° C.; a SAFT of at least 70° C., preferably at least of 100° C.; and/or a cloud point of 275° C. or less, preferably 130° C. or less.

In one embodiment, the adhesive has the following properties:
(a) at least 50% (preferably at least 60%, preferably at least 70%, preferably at least 80%) fiber tear at 2° C. using Inland paper board as a substrate;
(b) a viscosity of less than 50,000 mPa·s at 190° C. (preferably less than 40,000 mPa·s, preferably less than 30,000 mPa·s);
(c) a set time of less than 2 seconds (preferably between 0.5 and 2 seconds); and
(d) a toughness of at least 3.4 megajoule/$m^3$ (preferably at least 7 MJ/$m^3$, preferably at least 14 MJ/$m^3$).

In an embodiment, said adhesive has a viscosity of less than 25,000 mPa·s, such as less than 10,000 mPa·s, for example less than 5,000 mPa·s, typically less than 1,000 mPa·s at 190° C.

In an embodiment, said adhesive has a toughness of at least 3.4 megajoule/$m^3$ when the viscosity at 190° C. is less than 1000 mPa·s; a toughness of at least 7 megajoule/$m^3$ and an elongation of at least 100% when viscosity at 190° C. is in a range from 1000 to 10,000 mPa·s; and a toughness greater than 14 megajoule/$m^3$ and an elongation of at least 400% when the viscosity at 190° C. is greater than 10,000 mPa·s.

In an embodiment, said adhesive has a characteristic set time of less than 2 seconds, typically between 1 and 2 seconds.

In other embodiments, the adhesive has a Dot T-Peel adhesion of at least 8 newtons for adhesion between a fiber board and a fabric substrate at room temperature and a Dot T-Peel adhesion of at least 8 newtons for adhesion between two polyethylene terephthalate (PET) films at room temperature (25° C.) and at 40° C.

In another embodiment, there is disclosed a method of sealing cartons comprising maintaining a reservoir of molten hot melt adhesive, applying the hot melt adhesive from the reservoir to a first substrate, placing a second substrate in contact with the adhesive applied to the first substrate, and applying adhering pressure for a period of time about equal to or greater than the characteristic set time of the adhesive. The method is characterized by introducing the hot melt adhesive described above into the reservoir.

In embodiments of the method, the time period for application of the adhering pressure is less than 4 seconds, less than 3 seconds, less than 2.5 seconds, less than 2 seconds or less than 1.5 seconds, for example, from about 0.5 to about 1.5 or to about 2 seconds, or from about 1 second to about 1.5 or to about 2 seconds. In an embodiment, the reservoir maintenance is at a temperature less than 190° C., preferably less than 180° C., preferably less than 170° C., preferably less than 160° C., preferably less than 150° C.

In one embodiment, the adhesive has at least 5% of fiber tear at −18° C. using Inland paper board as a substrate.

One formulation of the adhesive composition comprises at least 80 percent by weight of the propylene copolymer, up to 10 percent by weight of one or more tackifiers, up to 10 percent by weight of one or more waxes, and up to 15 percent by weight of one or more additives. Another typical formulation of the adhesive composition comprises at least 85 percent by weight of the propylene copolymer, up to 5 percent by weight of the wax, up to 5 percent by weight of functionalized polyolefin and up to 10 percent by weight of one or more additives. Yet another typical formulation of the adhesive composition comprises at least 90 percent by weight of the propylene copolymer, up to 5 percent by weight functionalized polyolefin, up to 5 percent by weight of one or more waxes, up to 5 percent by weight of one or more additives.

In a particular embodiment, the adhesives of this invention can be used in disposable articles. As used herein, "disposable articles" refer to articles that are not meant for extended use. A typical life span of a disposable article can be a single use for any given period of time to multiple uses that last from seconds to days, to even weeks or longer periods of use. Typically, disposable articles are formed by attaching a first disposable element to at least a portion of a second disposable element using an adhesive composition. Disposable elements may be formed from nonwoven fabrics, nonwoven webs, non-elastic nonwoven fabrics, elastic nonwoven fabrics, necked-bonded laminates, stretch-bonded laminates, spunbond-meltblown-spunbond laminates, polypropylene spunbonded layers, polyethylene layers, combination polyethylene and polypropylene spunbonded layers, elastic strands, styrene-isoprene-styrene, styrene-butadiene-styrene, styrene-ethylene/propylene-styrene, styrene-co-butadiene-styrene, polyurethane, woven fabrics, polypropylene, polyester, body fluid impermeable backsheets, body fluid impermeable layers, body fluid permeable layers, body fluid permeable covers, absorbents, tissues, elastomeric materials, superabsorbent polymers, polyolefin films, polyester films, polyvinylchloride films, polyvinylidine chloride films, polyvinyl acetate films, elastic attachment tape, frontal tape backing, wood, paper, barrier films, film laminates, nonwoven composites, textile materials, woven materials, durable fabrics, absorbents, elastomeric strands, elastomeric webs, tissues, films, coverstock materials, nonwoven polyethylene, perforated polyethylene, superabsorbent polymers, filaments, porous webs, fibers, loop fastener material, spunbonded nonwovens, liners, elastic side panels, fastening tape, elastic bands, rayon, nylon, cellulosic pulp, cellulosic fluff, superabsorbent batts, or combinations thereof. The disposable elements may have any thickness and may vary across a cross-section thereof, depending on its intended uses. In some aspects, the thicknesses may range from microns to meters. Preferred thicknesses range from microns to millimeters.

Exemplary disposable articles may include diapers, training pants, sanitary napkins, panty liners, incontinent wear, bed pads, surgical gowns, surgical drapes, rodent traps, hook and loop fasteners, garments, medical garments, swimwear, or combinations thereof.

The propylene copolymer for disposable adhesive applications preferably has a viscosity of less than 10,000 mPa·s at 190° C.; has tensile strength of at least 5.5 MPa (800 psi), preferably at least 6.9 MPa (1,000 psi), more preferably at least 8.3 MPa (1,200 psi); has an elongation of at least 100%, preferably at least 200%, more preferably at least 300%; and has a toughness of 3.4 megajoule/m$^3$ or more.

The adhesive composition is preferably also formulated to have a viscosity of less than 10,000 mPa·s at 190° C.; has tensile strength of at least 6.9 MPa (1000 psi), preferably at least 10.3 MPa (1500 psi), more preferably at least 13.8 MPa (2000 psi); have an elongation of at least 100%, preferably at least 200%, more preferably at least 300%.

The adhesive composition is preferably formulated to have a PAFT of 30° C. or more, and preferably a PAFT of from 30° C. to 110° C. The adhesive composition also has a SAFT of 50° C. or more, and preferably up to 200° C.

Furthermore, the adhesive composition used in the disposable article preferably has a peel strength (as measured according to ASTM D 1876) of from 90 to 625 g/cm or from 265 to 625 g/cm or from 15 to 450 g/cm. In another embodiment the peel strength of the adhesive composition is 90 to 1000 g/cm, alternately 200 to 900 g/cm.

In another embodiment, the adhesive composition has a creep resistance of from 70% to 95% at 38° C.

In one embodiment, the disposable article is a diaper having two different types of adhesive compositions. The first adhesive composition can be an elastic attachment type adhesive and the second type of adhesive can be a construction type adhesive, sometimes referred to as a core and chassis adhesive. It is advantageous to utilize one adhesive composition for both the elastic attachment adhesive and the construction adhesive because the use of two adhesives on the same diaper poses problems for the diaper manufacturer, which must ensure that the right adhesive is used in the correct melt tank and is applied to the correct place on the diaper. Accordingly, an adhesive that is capable of performing both types of bonding functions is highly desirable.

Elastic attachment adhesives bond elastic materials to disposable elements. Diapers have elastic bands on the legs and/or the waist of the diaper, and typically include a disposable element such as an elastic band attached to a second disposable element, which is the portion of the diaper forming the leg opening or waist. The adhesive composition is used to attach the elastic band to the second disposable element, which is usually a fluid-impermeable barrier layer. An elastic attachment adhesive primarily exhibits high creep resistance to ensure that the elastic, when under stress, does not move relative to the surface of the second disposable element or become partially or fully detached. Should the elastic move or become detached, the resulting loss of fit could result in inconvenience, waste, embarrassment, discomfort, and associated health and safety problems.

In particular, elasticized areas can be formed by adhesively bonding non-elastic nonwoven fabrics together with at least one elastic strand disposed in the middle. In such a process, the elasticized area is a laminated structure including a nonwoven substrate, at least one elastic strand and a hot-melt adhesive composition, which binds the nonwoven substrate and the at least one elastic strand to one another. The nonwoven substrate is selected from the group consisting of a necked-bonded laminate, a stretch-bonded laminate, a spunbond-meltblown-spunbond laminate, a polypropylene spunbonded layer, and a polyethylene layer in combination with a polypropylene spunbonded layer, or a combination thereof. The elastic strand is selected from the group comprising styrene-isoprene-styrene, styrene-butadiene-styrene, styrene-ethylene/propylene-styrene, styrene/ethylene-co-butadiene/styrene, polyurethane, and combinations thereof.

Another method of forming the elasticized areas includes adhesively bonding an elastic nonwoven fabric together with a non-elastic nonwoven fabric. In such a process, a hot-melt adhesive composition binds a first nonwoven elastic substrate and a second nonwoven substrate to one another. The first nonwoven elastic substrate is selected from the group including a necked-bonded laminate, a stretch-bonded laminate, a polypropylene spunbonded layer, a polyethylene layer in combination with a polypropylene spunbonded layer, a styrene-isoprene-styrene strand, a styrene-butadiene-styrene strand, a styrene-ethylene/propylene-styrene strand, a styrene/ethylene-co-butadiene/styrene strand, and a polyurethane strand. The second nonwoven substrate is selected from the group including a necked-bonded laminate, a stretch-bonded laminate, a spunbond-meltblown-spunbond laminate, a polypropylene spunbonded layer, a polyethylene layer in combination with a polypropylene spunbonded layer, a styrene-isoprene-styrene strand, a styrene-butadiene-styrene strand, a styrene-ethylene/propylene-styrene strand, a styrene/ethylene-co-butadiene/styrene strand, and a polyurethane strand.

Elastic attachment adhesives preferably function at body temperature under high peel stress or high shear stress for long periods of time, so that the adhesives should exhibit high peel strength and high shear strength.

The propylene copolymer for elastic attachment adhesive applications preferably has a viscosity in a range of 2000 to 25,000 mPa·s at 190° C.; has tensile strength of at least 5.5 MPa (800 psi), preferably at least 6.9 MPa (1000 psi), more preferably at least 8.3 MPa (1200 psi); has an elongation of at least 200%, preferably at least 400%, more preferably at least 600%; and has a toughness of 7 megajoule or more.

The adhesive composition is also preferably formulated to have a viscosity of less than 25,000 mPa·s at 190° C. as measured using Brookfield digital viscometer; has tensile strength of at least 6.9 MPa (1000 psi), preferably at least 10.3 MPa (1500 psi), more preferably at least 13.8 MPa (2000 psi); have an elongation of at least 400%, preferably at least 600%, more preferably at least 800%.

In a particular embodiment, the adhesives described herein can be used in woodworking processes. A woodworking process involves forming a woodworking article by applying an adhesive composition to at least a portion of a structural element. The structural element can include a variety of materials, which include, but are not limited to wood or plywood, or plastic or veneer. For example, the structural element can also include lumber, wood, fiberboard, plasterboard, gypsum, wallboard, plywood, PVC, melamine, polyester, impregnated paper and sheetrock. A woodworking process can be used to form indoor furniture, outdoor furniture, trim, molding, doors, sashes, windows, millwork and cabinetry, for example.

The propylene copolymer for woodworking adhesive applications preferably has a viscosity of less than 25,000 mPa·s at 190° C.; has tensile strength of at least 5520 kPa (800 psi), preferably at least 6.89 MPa (1000 psi), more preferably at least 8.27 MPa (1200 psi); has an elongation of at least 200%, preferably at least 400%, more preferably at least 600%, and has a toughness of 7 megajoule or more.

The adhesive composition is also preferably formulated to have a viscosity of less than 25,000 mPa·s at 190° C.; has tensile strength of at least 6.89 MPa (1000 psi), preferably at least 10.34 MPa (1500 psi), more preferably at least 13.79 MPa (2000 psi); have an elongation of at least 200%, preferably at least 400%, more preferably at least 600%.

In yet another aspect, the adhesive composition has an open time of 3 seconds or more. Preferably, the adhesive composition has an open time of 20 seconds or more. More preferably, the adhesive composition has an open time of 60 seconds or more. In another aspect, the adhesive composition has a set time of 5 minute or less, preferably 3 minutes or less, more preferably 2 minutes or less.

One typical formulation of the adhesive includes at least 70 percent by weight of the base polymer, up to 10 percent by weight of one or more functionalized polyolefins, up to 10 percent by weight of one or more waxes, up to 15 percent by weight of one or more tackifiers, and up to 10 percent by weight of one or more additives.

Accordingly, the present invention also provides the following embodiments:

1. An adhesive comprising a polyolefin base polymer and from 1 to 15 wt % of at least two wax components, based on the total weight of the polyolefin base polymer and the at least two wax components, wherein the at least two wax components comprises a first wax component and a second wax component wherein a weight average molecular weight of the second wax component ($Mw_{wax2}$) is at least 1000 g/mole greater relative to a weight average molecular weight of the first wax component ($Mw_{wax1}$)
2. The adhesive of embodiment 1 wherein the adhesive has the following properties:
   (a) at least 50% fiber tear at 25° C. using Inland paper board as a substrate; and
   (c) a set time of less than 3 seconds.
3. The adhesive of any one of embodiment 1 or 2, further comprising from 1 to 10 wt % of at least one functionalized polyolefin.
4. The adhesive of embodiment 3, wherein said functionalized polyolefin comprises from 1 to 6 wt % of the adhesive.
5. The adhesive of embodiment 3 or 4, wherein said functionalized polyolefin has an acid number from 2 to 100.
6. The adhesive of any one of embodiments 3 to 5, wherein said functionalized polyolefin comprises maleated polypropylene.
7. The adhesive of claim any one of embodiments 1 to 6, wherein the polyolefin base polymer is functionalized.
8. The adhesive of any one of embodiments 1 to 7, wherein the adhesive comprises at least 80 wt % of the polyolefin base polymer, wherein the polyolefin base polymer comprises a propylene copolymer comprising at least 80 wt % of units derived from propylene and from about 2 to about 15 wt % of units derived from at least one $C_6$ to $C_{10}$ alpha-olefin, wherein the copolymer has a molecular weight of less than 100,000 g/mol and a heat of fusion between about 10 and about 70 J/g.
9. The adhesive of embodiment 8 wherein the propylene copolymer comprises from about 6 wt % to about 12 wt % of units derived from the at least one $C_6$ to $C_{10}$ alpha-olefin.
10. The adhesive of embodiment 8 or 9 wherein the propylene copolymer consists essentially of units derived from propylene and said at least one $C_6$ to $C_{10}$ alpha-olefin.
11. The adhesive of any one of embodiments 8 to 10, wherein the propylene copolymer comprises hexene-1.
12. The adhesive of any one of embodiments 8 to 11, wherein the copolymer has a weight average molecular weight of at least 10,000 and less than 50,000 g/mol.
13. The adhesive of any one of embodiments 8 to 11, wherein the Mw/Mn of the copolymer is between about 1.5 and about 10.
14. The adhesive of any one of embodiments 8 to 1, wherein said copolymer has a heat of fusion between about 10 and about 60 J/g.

15. The adhesive of any one of embodiments 1 to 14, wherein the polyolefin base polymer comprises polypropylene having a weight average molecular weight of from 10,000 to 100,000 g/mol and a branching index (g') from 0.4 to 0.95 measured at the Mz of the polypropylene.

16. The adhesive of any one of embodiments 1 to 15, wherein said at least two wax components comprise from 6 to 15 wt % of the adhesive.

17. The adhesive of any one of embodiments 1 to 16, wherein $Mw_{wax1}$ is less than about 4000 g/mole and $Mw_{wax2}$ is greater than about 5000 g/mole.

18. The adhesive of any one of embodiments 1 to 17, wherein $Mw_{wax1}$ is from about 450 to about 4000 g/mole and $Mw_{wax2}$ is from about 5000 to about 20,000 g/mole.

19. The adhesive of any one of embodiments 1 to 18, wherein a weight ratio of the first wax component to the second wax component in the at least two wax components are from about 10:90 to about 90:10.

20. The adhesive of any one of embodiments 1 to 19, wherein a weight ratio of the first wax component to the second wax component in the at least two wax components are from about 30:70 to about 70:30.

21. The adhesive of any one of embodiments 1 to 20, wherein the first wax component has a Brookfield viscosity at 190° C. of 100 mPa·s or less and the second wax component has a viscosity at 190° C. of 190 mPa·s or more.

22. The adhesive of any one of embodiments 1 to 21, wherein said adhesive has a Shear Adhesion Fail Temperature (SAFT) of at least 100° C.

23. The adhesive of any one of embodiments 1 to 22, wherein the polyolefin base polymer has a viscosity at 190° C. of less than 25,000 mPa·s.

24. The adhesive of any one of embodiments 1 to 23, wherein the polyolefin base polymer has a viscosity at 190° C. in the range from 1000 to 10,000 mPa·s and the adhesive has a toughness of at least 7 megajoule/m$^3$ and an elongation of at least 100%.

25. A method of joining substrates, comprising maintaining a reservoir of molten hot melt adhesive, applying the hot melt adhesive from the reservoir to a first substrate, placing a second substrate in contact with the adhesive applied to the first substrate, and applying adhering pressure for a period of time about equal to or greater than the characteristic set time of the adhesive, characterized by introducing the adhesive of any one of embodiments 1 to 24 into the reservoir.

The invention will now be more particularly described with reference to the following non-limiting Examples.

In the Examples, the hexene-1 content was determined using C-13 NMR. In preparation of a polymer for C-13 NMR analysis about 0.2-0.3 grams of polymer was dissolved in about 3 ml of deuterated tetrachloroethane in a 10-mm diameter NMR tube at about 120° C., then the sample solution was placed into an NMR spectrometer with the probe temperature set to 120° C. Spectral data were collected for at least four hours using an observe pulse angle of less than 90 degrees, ungated proton decoupling and a delay time long enough to allow adequate quantification of the NMR signals of interest. Interpretation of the data is based in part on peak assignments provided by Kissin and Brandolini (Macromolecules, 24, 2632, (1991)), Folini, et al., (Macromol. Chem. Phys., 201, 401 (2000)) and Resconi, et al., (Chem. Rev., 100, 1253, (2000). Instrument measured integral intensities were used to determine sample composition.

Peak melting point, Tm, (also referred to as melting point), peak crystallization temperature, Tc, (also referred to as crystallization temperature), glass transition temperature (Tg), heat of fusion ($\Delta Hf$ or Hf), and percent crystallinity were determined using the following differential scanning calorimetric (DSC) procedure according to ASTM D3418-03. DSC data were obtained using a TA Instruments model Q100 machine. Samples weighing approximately 5-10 mg were sealed in an aluminum hermetic sample pan. The DSC data were recorded by first gradually heating the sample to 200° C. at a rate of 10° C./minute. The sample was kept at 200° C. for 2 minutes, then cooled to −90° C. at a rate of 10° C./minute, followed by an isothermal for 2 minutes and heating to 200° C. at 10° C./minute. Both the first and second cycle thermal events were recorded. Areas under the endothermic peaks were measured and used to determine the heat of fusion and the percent of crystallinity. The percent crystallinity is calculated using the formula, [area under the melting peak (Joules/gram)/B (Joules/gram)]*100, where B is the heat of fusion for the 100% crystalline homopolymer of the major monomer component. These values for B are to be obtained from the Polymer Handbook, Fourth Edition, published by John Wiley and Sons, New York 1999, provided however that a value of 189 J/g (B) is used as the heat of fusion for 100% crystalline polypropylene, a value of 290 J/g is used for the heat of fusion for 100% crystalline polyethylene. The melting and crystallization temperatures reported here were obtained during the second heating/cooling cycle unless otherwise noted.

For polymers displaying multiple endothermic and exothermic peaks, all the peak crystallization temperatures and peak melting temperatures were reported. The heat of fusion for each endothermic peak was calculated individually. The percent crystallinity is calculated using the sum of heat of fusions from all endothermic peaks. Some of polymer blends produced show a secondary melting/cooling peak overlapping with the principal peak, which peaks are considered together as a single melting/cooling peak. The highest of these peaks is considered the peak melting temperature/crystallization point. For the amorphous polymers, having comparatively low levels of crystallinity, the melting temperature is typically measured and reported during the first heating cycle. Prior to the DSC measurement, the sample was aged (typically by holding it at ambient temperature for a period of 2 days) or annealed to maximize the level of crystallinity.

Molecular weights (number average molecular weight (Mn), weight average molecular weight (Mw), and z-average molecular weight (Mz)) were determined using a Polymer Laboratories Model 220 high temperature SEC with on-line differential refractive index (DRI), light scattering (LS), and viscometer (VIS) detectors. It used three Polymer Laboratories PLgel 10 m Mixed-B columns for separation using a flow rate of 0.54 ml/min and a nominal injection volume of 300 μL. The detectors and columns are contained in an oven maintained at 135° C. The light scattering detector is a high temperature miniDAWN (Wyatt Technology, Inc.). The primary components are an optical flow cell, a 30 mW, 690 nm laser diode light source, and an array of three photodiodes placed at collection angles of 45°, 90°, and 135°. The stream emerging from the SEC columns is directed into the miniDAWN optical flow cell and then into the DRI detector. The DRI detector is an integral part of the Polymer Laboratories SEC. The viscometer is a high temperature viscometer purchased from Viscotek Corporation and comprising four capillaries arranged in a Wheatstone bridge configuration with two pressure transducers. One transducer measures the total pressure drop across the detector, and the other, positioned between the two sides of the bridge, measures a differential pressure. The viscometer is inside the SEC oven, positioned after the DRI detector. The details of these detectors as well as their calibrations have been described by, for example, T. Sun, P.

Brant, R. R. Chance, and W. W. Graessley, in Macromolecules, Volume 34, Number 19, 6812-6820, (2001), incorporated herein by reference.

Solvent for the SEC experiment was prepared by adding 6 grams of butylated hydroxy toluene (BHT) as an antioxidant to a 4 liter bottle of 1,2,4 trichlorobenzene (TCB) (Aldrich Reagent grade) and waiting for the BHT to solubilize. The TCB mixture was then filtered through a 0.7 micron glass pre-filter and subsequently through a 0.1 micron Teflon filter. There was an additional online 0.7 micron glass pre-filter/0.22 micron Teflon filter assembly between the high pressure pump and SEC columns. The TCB was then degassed with an online degasser (Phenomenex, Model DG-4000) before entering the SEC. Polymer solutions were prepared by placing dry polymer in a glass container, adding the desired amount of TCB, then heating the mixture at 160° C. with continuous agitation for about 2 hours. All quantities were measured gravimetrically. The TCB densities used to express the polymer concentration in mass/volume units were 1.463 g/ml at room temperature and 1.324 g/ml at 135° C. The injection concentration ranged from 1.0 to 2.0 mg/ml, with lower concentrations being used for higher molecular weight samples.

The branching index in the Examples was measured using SEC with an on-line viscometer (SEC-VIS) and is reported as g' at each molecular weight in the SEC trace. The branching index g' is defined as:

$$g' = \frac{\eta_b}{\eta_l}$$

where $\eta_b$ is the intrinsic viscosity of the branched polymer and $\eta_l$ is the intrinsic viscosity of a linear polymer of the same viscosity-average molecular weight ($M_v$) as the branched polymer. $\eta_l = KM_v^\alpha$, K and α were measured values for linear polymers and should be obtained on the same SEC-DRI-LS-VIS instrument as the one used for branching index measurement. For polypropylene samples presented in this invention, K=0.0002288 and α=0.705 were used. The SEC-DRI-LS-VIS method obviates the need to correct for polydispersities, since the intrinsic viscosity and the molecular weight were measured at individual elution volumes, which arguably contain narrowly dispersed polymer. Linear polymers selected as standards for comparison should be of the same viscosity average molecular weight, monomer content and composition distribution. Linear character for polymer containing C2 to C10 monomers is confirmed by Carbon-13 NMR using the method of Randall (Rev. Macromol. Chem. Phys., C29 (2&3), p. 285-297). Linear character for C11 and above monomers is confirmed by GPC analysis using a MALLS detector. For example, for a copolymer of propylene, the NMR should not indicate branching greater than that of the co-monomer (i.e. if the comonomer is butene, branches of greater than two carbons should not be present). For a homopolymer of propylene, the GPC should not show branches of more than one carbon atom. When a linear standard is desired for a polymer where the comonomer is C9 or more, one can refer to T. Sun, P. Brant, R. R. Chance, and W. W. Graessley, *Macromolecules*, Volume 34, Number 19, 6812-6820, (2001) for protocols on determining standards for those polymers. In the case of syndiotactic polymers, the standard should have a comparable amount of syndiotacticity as measured by Carbon 13 NMR. The viscosity average g' was calculated using the following equation:

$$g'_{vis} = \frac{\sum C_i[\eta_i]_b}{\sum C_i KM_i^\alpha}$$

where $C_i$ is the polymer concentration in the slice i in the polymer peak, and $[\eta_i]_b$ is the viscosity of the branched polymer in slice i of the polymer peak, and $M_i$ is the weight average molecular weight in slice i of the polymer peak measured by light scattering, K and α are as defined above.

EXAMPLES

All of the propylene copolymers used in the hot melt adhesive composition examples were prepared using the following procedure. The polymerizations were performed in a liquid filled, single-stage continuous reactor using mixed metallocene catalyst systems. The reactor was a 0.5-liter stainless steel autoclave reactor and was equipped with a stirrer, a water cooling/steam heating element with a temperature controller, and a pressure controller. Solvents, propylene, and comonomers (such as 1-hexene and 1-octene) were first purified by passing through a three-column purification system. The purification system consisted of an OXICLEAR column (Model # RGP-R1-500 from Labclear) followed by a 5A and a 3A molecular sieve columns. Purification columns were regenerated periodically whenever there was evidence of lower activity of polymerization. Both the 3A and 5A molecular sieve columns were regenerated in-house under nitrogen at a set temperature of 260° C. and 315° C., respectively. The molecular sieve material was purchased from Aldrich. Oxiclear column was regenerated in the original manufacture. The purified solvents and monomers were then chilled to about −15° C. by passing through a chiller before being fed into the reactor through a manifold. Solvent and monomers were mixed in the manifold and fed into reactor through a single tube. All liquid flow rates were measured using BROOKS mass flow meters or MICRO-MOTION Coriolis-type flow meters.

The catalyst was rac-dimethylsilylbis(2-methyl-4-phenyl-indenyl) zirconium dimethyl (obtained from Basell) pre-activated with N,N-dimethylanilinium tetrakis (pentafluorophenyl) borate (obtained from Albemarle) at a molar ratio of about 1:1 in toluene. The catalyst solution was kept in an inert atmosphere with <1.5 ppm water content and was fed into reactor by a metering pump through a separated line. Catalyst and monomer contacts took place in the reactor.

As an impurity scavenger, 250 ml of tri-n-octyl aluminum (TNOA) (25 wt % in hexane, Sigma Aldrich) was diluted in 22.83 kilogram of hexane. The TNOA solution was stored in a 37.9-liter cylinder under nitrogen blanket. The solution was used for all polymerization runs until about 90% of consumption, then a new batch was prepared. The feed rates of the TNOA solution were adjusted in a range from 0 (no scavenger) to 4 ml per minute to achieve a maximum catalyst activity.

The reactor was first cleaned by continuously pumping solvent (e.g., hexane) and scavenger through the reactor system for at least one hour at a maximum allowed temperature (about 150° C.). After cleaning, the reactor was heated/cooled to the desired temperature using a water/steam mixture flowing through the reactor jacket and controlled at a set pressure with controlled solvent flow. Monomers and catalyst solutions were then fed into the reactor when a steady state of operation was reached. An automatic temperature control system was used to control and maintain the reactor at a set temperature. Onset of polymerization activity was determined by observations of a viscous product and lower temperature of water-steam mixture. Once the activity was established and the system reached equilibrium, the reactor was lined out by continuing operation of the system under the established condition for a time period of at least five times of mean residence time prior to sample collection. The resulting mixture, containing mostly solvent, polymer and unreacted monomers, was collected in a collection box after the system reached a steady state operation. The collected samples were first air-dried in a hood to evaporate most of the solvent, and then dried in a vacuum oven at a temperature of about 90° C. for about 12 hours. The vacuum oven dried samples were weighed to obtain yields. All the reactions were carried out at a pressure of about 2.41 MPa-g. The detailed polymerization conditions and some product properties are listed in Table 1.

Base polymer components PP1 to PP7 were then formulated into hot melt adhesives. The base polymer components listed in Table 1 were formulated with a wax, a functionalized polyolefin and an antioxidant for packaging adhesive application. The waxes had molecular weights ranging from 10.4 to 18.7% that of the respective base polymers. All of these samples were blended with 0.9 wt % of Irganox 1010. The blending was carried out at low shear mixing at elevated temperature of about 177° C. IRGANOX 1010 is a phenolic antioxidant available from Ciba-Geigy. MAPP40 is a maleic anhydride modified polypropylene, having an acid number of 50, a viscosity of 300 mPa·s at 190° C., and a softening point of 149° C., available from Chusei, USA. AC 596 is polypropylene-maleic anhydride copolymer from Honeywell, having a viscosity at 190° C. of less than 400 mPa·s, and Mettler drop

TABLE 1

Base Polymer Component Examples

| | Base Polymer Component | | | | | | |
|---|---|---|---|---|---|---|---|
| | PP1 | PP2 | PP3 | PP4 | PP5 | PP6 | PP7 |
| Polymerization temperature (° C.) | 110 | 113 | 105 | 125 | 113 | 113 | 105 |
| Propylene feed rate (g/min) | 14 | 14 | 14 | 14 | 14 | 14 | 14 |
| Hexene-1 feed rate (ml/min) | 3 | 3 | 6 | 1 | 3 | 2.7 | 7 |
| Isohexane feed rate (ml/min) | 80 | 80 | 80 | 80 | 80 | 80 | 80 |
| Catalyst feed rate (µmol/min) | 0.255 | 0.255 | 0.284 | 0.236 | 0.255 | 0.255 | 0.189 |
| Conversion (%) | 81.4 | 81.5 | 77.3 | 87.8 | 75.8 | 80.6 | 58.2 |
| Hexene-1 content (wt %) | 10.1 | 14.1 | 20.5 | 1.4 | 16.5 | 10.5 | 27.9 |
| Tm (° C.) | 104.7 | 102.0 | 74.7 | 120.6 | 100.9 | 104.6 | 44.4 |
| Tc (° C.) | 66.0 | 61.8 | 7.4 | 83.7 | 54.3 | 58.3 | −5.4 |
| Tg (° C.) | −13.5 | −13.1 | −16.9 | | −13.3 | −11.6 | −20.8 |
| Heat of fusion (J/g) | 54.6 | 49.2 | 32.9 | 76.6 | 49.7 | 53.6 | 20.5 |
| Viscosity, 190° C. (mPa · s) | 1157 | 595 | 2990 | 155 | 615 | 701 | 4510 |
| Mn, LS (kg/mol) | 18.2 | 16.2 | 29.1 | 8.2 | 14.8 | 15.1 | 32.8 |
| Mw, LS (kg/mol) | 36.1 | 31.1 | 55.9 | 15.8 | 28.9 | 28.9 | 58.9 |
| Mz, LS (kg/mol) | 66.4 | 56.4 | 102.0 | 30.6 | 54.2 | 58.9 | 96.0 |

Homo-polypropylene (h-PP) and homo-polyethylene (PEwax1, PEwax2 and PEwax3) were prepared using the same general procedure as that for base polymer components PP1 to PP7. The catalyst used for PE wax was bis(cyclopentadienyl)zirconium dimethyl pre-activated with N,N-dimethylanilinium tetrakis (pentafluorophenyl) borate. rac-Dimethylsilylbis(2-methyl-4-phenylindenyl) zirconium dimethyl (obtained from Albemarle) pre-activated with N,N-dimethylanilinium tetrakis (pentafluorophenyl) borate was used to make polypropylene. Detailed process conditions and some characteristic property data are listed in Table 2.

TABLE 2

Prepared Wax/h-PP Component Examples

| Wax/h-PP | h-PP | PEwax1 | PEwax2 | PEwax3 |
|---|---|---|---|---|
| Tm (C.) | 132.36 | 128.55 | 131.5 | 131.8 |
| Tc (C.) | 95.48 | 112.97 | 115.9 | 115.0 |
| Heat of fusion (J/g) | 84.96 | 253.5 | 250 | 250.9 |
| Viscosity @190 C. (mPa · s) | 172.9 | 192 | 2783 | 1007 |
| Mn, LS (kg/mol) | 9.4 | 3.5 | 7.2 | 4.6 |
| Mw, LS (kg/mol) | 16.9 | 5.2 | 12.5 | 8.6 |
| Mz, LS (kg/mol) | 37.6 | 9.0 | 34.2 | 14.7 | point of 143° C. POLYWAX 3000 from Baker Petrolite is fully saturated homopolymers of ethylene that have high degrees of linearity and crystallinity. This synthetic wax has narrow molecular weight distributions, a viscosity of 130 mPa·s at temperature of 149° C., a crystallization temperature of 112.7° C. and a melting temperature of 129° C. LICOCENE PE 5301 is metallocene catalyst based polyethylene wax available from Clariant, having a density of 0.96-0.98 g/cm³, a drop point of 128° C.-133° C., a crystallization temperature of 112.9° C. and a viscosity of about 350 mPa·s at 140° C. LICOWAX PE 130 is a high density polyethylene wax from Clariant, having a viscosity of about 350 mPa·s at temperature of 140° C., a density of 0.96-0.98 g/cm³, a crystallization temperature of 113° C. and a drop point of 127° C.-132° C. SASOL C80 wax is a Fischer-Tropsch wax obtained from Moore and Munger, having a viscosity of 3.3 mPa·s at 170° C. and a crystallization temperature of 72.7° C. Licocene 7502 is polypropylene wax from Clariant, having a viscosity of about 1800 mPa·s at 170° C. and a softening point of about 165° C. Inland Paper Board was used as the substrate in all of the adhesion tests, and is a high performance box board obtained from Inland Paper Board and Packaging Company of Rome, Ga. It is characterized as a #56 virgin high performance paper board stock. The formulation and tested results are listed in Table 3.

TABLE 3

Hot Melt Adhesive Examples

| | HMA1 | HMA2 | HMA3 | HMA4 | HMA5 | HMA6 |
|---|---|---|---|---|---|---|
| Base polymer component | PP6 | PP5 | PP2 | PP5 | PP1 | PP5 |
| Base polymer component (wt %) | 88.1 | 86.1 | 91.08 | 91.06 | 91.06 | 82.6 |
| Wax 1 | Polywax 3000 | Clariant PE5301 | PE-wax | Clariant PE130 | Licocene PE 5301 | Clariant PE5301 |
| Wax 1 (wt %) | 8 | 10 | 6.01 | 6.03 | 6.00 | 9.59 |
| Wax 2 | | | | | | Licocene 7502 |
| Wax 2 (wt %) | | | | | | 4.07 |
| MAPP 40 (wt %) | 3 | 3 | 2.09 | 2.03 | 2.02 | 2.88 |
| Irganox 1010 (wt %) | 0.9 | 0.9 | 0.9 | 0.88 | 0.92 | 0.86 |
| Viscosity, 177° C. (mPa·s) | 635 | 708 | | | | |
| Viscosity, 190° C. (mPa·s) | 505 | 550 | | | | |
| Set Time (s) | 1.5 | 1.5 | 1.75 | 1.75 | 1.75 | 1.75 |
| Fiber tear, room temperature (%) | 91 | 95 | 80 | 95 | 97 | 70 |
| Fiber tear, 2° C. (%) | 52 | 92 | 73 | 66 | 95 | 63 |
| Fiber tear, −18° C. (%) | 15 | 48 | 55 | 15 | 80 | 27 |
| PAFT, 100 g (° C.) | 75 | 69 | | | | |
| SAFT, 500 g (° C.) | 113 | 111 | | | | |
| IOPP, 4 of 5 pass (° C.) | 100 | 75 | | | | |

The formulated adhesives have good fiber tear at all three temperatures and a below 2-second set time. Examples HMA1 to HMA6 demonstrate that well balanced adhesive performance was achieved through the combination of base polymer components and waxes.

The adhesive compositions listed in Table 3 were subjected to DSC thermal analysis. As an example, the DSC traces of the cooling cycle for HMA3, the neat base polymer PP2 and the neat PE-wax, are shown in the FIGURE. The DSC of HMA3 composition showed two crystallization peaks during the cooling cycle, with a first (highest) crystallization point (Tc) at 111.3° C. and a second crystallization point at 73.8° C. The first peak is attributed to wax crystallization and the second peak is attributed to base polymer crystallization. The Tc of the first peak, 111.3° C., is close to the Tc of the neat wax, 113° C. This indicates that the wax component in the HMA mixture crystallized at a higher temperature than the other ingredients during the cooling. The shifting of the Tc peak in HMA3 corresponding to the PP2 component, 73.8° C. in the HMA3 vs. 61.8° C. in neat PP2, or an upward shift of about 12° C., is attributed to the nucleating effects of the wax on the base polymer.

Examples HMA7 to HMA11 in Table 4 demonstrated the use of two propylene polymer components to provide the base polymer with an overall comonomer content and molecular weight according to embodiments of the invention. To provide for easy processing and good coating quality, HMAs typically are relatively low in molecular weight or viscosity, but this can compromise cohesive strength. Blending two or more polymers provides the opportunity to improve cohesive strength without increasing the viscosity of the HMA.

TABLE 4

Hot Melt Adhesive Examples

| | HMA7 | HMA8 | HMA9 | HMA10 | HMA11 |
|---|---|---|---|---|---|
| Base polymer 1 | PP3 | PP3 | PP7 | PP3 | PP7 |
| Base polymer 1 (wt %) | 51.57 | 51.56 | 36.09 | 41.08 | 34.1 |
| Base polymer 2 | h-PP | h-PP | PP4 | PP4 | PP4 |
| Base polymer 2 (wt %) | 34.39 | 34.39 | 51.99 | 44.97 | 51.99 |
| Wax | Polywax 3000 | Clariant PE5301 | Clariant PE5301 | Polywax 3000 | Polywax 3000 |
| Wax (wt %) | 10 | 10 | 8 | 9.99 | 10 |
| AC 596 (wt %) | 3.124 | 3.123 | 3.01 | 3.05 | 3.01 |
| IRGANOX 1010 (wt %) | 0.901 | 0.9 | 0.9 | 0.9 | 0.9 |
| Set Time(s) | 1.75 | 1.75 | 1.75 | 1.5 | 1.5 |
| Fiber tear at room temperature (%) | 88 | 88 | 87 | 75 | 49 |
| Fiber tear at 2° C. (%) | 73 | 78 | 35 | 45 | 12 |
| Fiber tear at −18° C. (%) | 44 | 44 | 6 | 2 | 0 |

The polymer blend of PP3 and h-PP (HMA7 and HMA8) had a viscosity at 190° C. of about 1130 mPa·s, a heat of fusion of 61.4 J/g and a crystallization temperature of 92° C. The polymer blend of PP7 and PP4 (HMA9 and HMA11) had a viscosity at 190° C. of 852 mPa·s, a heat of fusion of 54.3 J/g and a crystallization temperature of 73.7° C. The polymer blend of PP3 and PP4 (HMA10) had a viscosity at 190° C. of 735 mPa·s, a heat of fusion of 48.5 J/g and a crystallization temperature of 69.6° C. All of these samples were blended with about 0.9 wt % of IRGANOX 1010. The blending was carried out at low shear mixing at elevated temperature of about 177° C. The Inland board was used as the substrate for all of the adhesion tests. All of the formulated adhesives have good fiber tear at three temperatures and a sub 2-second set time.

In the following examples, base polymer PP8 was a propylene/hexene copolymer produced in two continuous stirred tank reactors in series. The reactors were operated under a pressure of 1.17 MPa(gauge) (170 psig). The temperature of the lead reactor was controlled by removing heat in a pump-around heat exchanger. The temperature of the tail reactor was also controlled by removing heat in a pump-around heat exchanger. The residence time of the feed in the lead reactor was 66 minutes, and the residence time in the tail reactor was 57 minutes. Propylene and 1-hexene were combined with hexane to form the feed solution to the lead reactor. A 15 wt % solution of tri-n-octyl aluminum (TNOA) in hexane (obtained from Albemarle) was introduced into this stream before entering into the lead reactor. Catalyst and activator entered the lead reactor from a separate port on the lead reactor. Two separate catalyst solutions were prepared, one comprising a mixture of di(p-triethylsilylphenyl)methylene] (cyclopentadienyl) (3,8-di-t-butylfluorenyl)hafnium dimethyl in toluene, and the other comprising a mixture of rac-dimethylsilyl bis(2-methyl-4-phenylindenyl) zirconium dimethyl in toluene. The activator feed stream was made up of a 0.28 wt % solution of N,N-dimethylanilinium tetrakis(pentafluorophenyl) borate in toluene. The catalyst and activator feed lines were configured to mix in line upstream of the lead reactor. Additional propylene and hexane (without 1-hexene) were added to the tail reactor. Molten polymer was recovered from solution via three flash stages, each with a preheater. The first stage (0.48 MPa (gauge) (70 psig)) polymer contained about 30% solvent and the second stage (0.034 MPa (gauge) (5 psig)) incorporated about 5-10% solvent while the third stage (5.5 Pa (0.8 psia)) incorporated about 100 ppm volatiles. Following devolatization, polymer was collected into a holdup day-tank for production of large samples. PP8 had a Tm=126.8° C., Tc=70.5° C., Tg=−15.3° C., a heat of fusion=47.5 J/g, Mn=7650 g/mol, Mw=33600 g/mol, Mz=69900 g/mol, and a viscosity of 1000 mPa·s at 190° C.

Examples HMA12 to HMA16 in Table 5 demonstrated the use of bimodal wax blend components in PP8 to provide the adhesive formulation with a balance of rapid set time and high adhesion according to embodiments of the invention. In general, the use of relatively higher molecular weight waxes detracts from a short set time, whereas the use of relatively lower molecular weight waxes detracts from high adhesion. HMA17 and HMA18 used a single wax for comparison.

TABLE 5

Hot Melt Adhesive Examples with Two Wax Components

| | Hot melt adhesive | | | | | | |
|---|---|---|---|---|---|---|---|
| | HMA12 | HMA13 | HMA14 | HMA15 | HMA16 | HMA17 | HMA18 |
| Base polymer PP8 (wt %) | 86.1 | 86.1 | 86.1 | 86.0 | 81.1 | 89.1 | 86.1 |
| IRGANOX 1010 (wt %) | 0.9 | 0.9 | 0.9 | 0.9 | 0.9 | 0.9 | 0.9 |
| MAPP40 (wt %) | 0 | 0 | 0 | 0 | 0 | 3.0 | 0 |
| AC 596 (wt %) | 3.0 | 3.0 | 3.0 | 3.0 | 3.0 | 0 | 3.0 |
| C80 Wax | 0 | 0 | 0 | 0 | 0 | 7.0 | 0 |
| POLYWAX 3000 (wt %) | 5.0 | 8.0 | 5.0 | 8.0 | 5.0 | 0 | 0 |
| PEwax2 (wt. %) | 5.0 | 2.0 | 0.0 | 0.0 | 10.0 | 0 | 10.0 |
| PEwax3 (wt. %) | 0 | 0 | 5.1 | 2.1 | 0 | 0 | 0 |
| Set time (second) | 1.5 | 1.5 | 1.5 | 1.5 | 1.75 | 2.75 | 2.25 |
| Fiber tear at room temperature (%) | 85 | 91 | 87 | 88 | 88 | 94 | 94 |
| Fiber tear at 2° C. (%) | 83 | 51 | 87 | 83 | 83 | 86 | 89 |
| Fiber tear at −18° C. (%) | 37 | 25 | 22 | 15 | 86 | 66 | 47 |

HMA17 shows the performance of a composition containing 7 wt % POLYWAX 3000 (Mw=595). Although the adhesion is good, the corresponding set time is not particularly short. HMA18 shows the performance of a composition containing 10 wt % of high molecular weight PEwax2 (Mw=12, 500). The set time is not particularly good, but the corresponding adhesions are good. HMA13 to HMA17 show the performance of a composition containing 10 to 15 wt % of a blend of the POLYWAX 3000 with the high molecular weight polyethylene waxes PEwax2 and PEwax3. The bimodal wax-containing compositions exhibited improved overall performance, i.e., low set time and high adhesion.

Material closer to the surface of the hot melt adhesive will cool faster than in the bulk. Therefore, wax migration to the surface might lead to faster crystallization, producing faster set times. The rate of surface migration depends on molecular weight. The results presented in Table 5 may thus be due to differences in diffusion rates of the waxes in the bimodal wax blend.

The preceding description has been presented with reference to presently preferred embodiments of the invention. Persons skilled in the art and technology to which this invention pertains will appreciate that alterations and changes in the described compositions and methods can be practiced without meaningfully departing from the principle, and scope of this invention. Accordingly, the foregoing description should not be read as pertaining only to the exact embodiments described and shown in the accompanying drawings, but rather should be read as consistent with and as support for the following claims, which are to have their fullest and fairest scope.

All documents described herein are incorporated by reference herein, including any priority documents and/or testing procedures to the extent they are not inconsistent with this text, provided however that any priority document not named in the initially filed application or filing documents is NOT incorporated by reference herein. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What we claim is:

1. An adhesive comprising a polyolefin base polymer and from 1 to 15 wt % of at least two wax components, based on the total weight of the polyolefin base polymer and the at least two wax components; wherein the at least two wax components comprise a first wax component and a second wax component wherein the weight average molecular weight of the second wax component ($Mw_{wax2}$) is at least 1000 g/mole greater relative to the weight average molecular weight of the first wax component ($Mw_{wax1}$), and wherein $MW_{wax1}$ is less than about 4000 g/mole and $MW_{wax2}$ is greater than about 5000 g/mole.

2. The adhesive of claim 1, wherein the adhesive has the following properties:
   (a) at least 50% fiber tear at 25° C. using Inland paper board as a substrate; and
   (b) a set time of less than 3 seconds.

3. The adhesive of claim 1, further comprising from 1 to 10 wt % of at least one functionalized polyolefin.

4. The adhesive of claim 1, further comprising from 1 to 6 wt % of at least one functionalized polyolefin.

5. The adhesive of claim 3, wherein said functionalized polyolefin has an acid number from 2 to 100.

6. The adhesive of claim 3, wherein said functionalized polyolefin comprises maleated polypropylene.

7. The adhesive of claim 1, wherein the polyolefin base polymer is functionalized.

8. An adhesive comprising a polyolefin base polymer and from 1 to 15 wt % of at least two wax components, based on the total weight of the polyolefin base polymer and the at least two wax components, wherein the adhesive comprises at least 80 wt % of the polyolefin base polymer, wherein the polyolefin base polymer comprises a propylene copolymer comprising at least 80 wt % of units derived from propylene and from about 2 to about 15 wt % of units derived from at least one $C_6$ to $C_{10}$ alpha-olefin, wherein the copolymer has a molecular weight of less than 100,000 and a heat of fusion between about 10 and about 70 J/g, wherein the at least two wax components comprise a first wax component and a second wax component wherein the weight average molecular weight of the second wax component ($Mw_{wax2}$) is at least 1000 g/mole greater relative to the weight average molecular weight of the first wax component ($Mw_{wax1}$), and wherein $Mw_{wax1}$ is less than about 4000 g/mole and $Mw_{wax2}$ is greater than about 5000 g/mole.

9. The adhesive of claim 8, wherein the propylene copolymer comprises from about 6 wt % to about 12 wt % of units derived from the at least one $C_6$ to $C_{10}$ alpha-olefin.

10. The adhesive of claim 8, wherein the propylene copolymer consists essentially of units derived from propylene and said at least one $C_6$ to $C_{10}$ alpha-olefin.

11. The adhesive of claim 8, wherein the $C_6$ to $C_{10}$ alpha-olefin comprises hexene-1.

12. The adhesive of claim 8, wherein the copolymer has an Mw of at least 10,000 and less than 50,000 g/mol.

13. The adhesive of claim 8, wherein Mw/Mn of the copolymer is between about 1.5 and about 10.

14. The adhesive of claim 8, wherein said copolymer has a heat of fusion between about 10 and about 60 J/g.

15. The adhesive of claim 1, wherein the polyolefin base polymer comprises polypropylene having a weight average molecular weight of from 10,000 to 100,000 g/mol and a branching index (g') from 0.4 to 0.95 measured at the Mz of the polypropylene.

16. The adhesive of claim 1 comprising from 6 to 15 wt % of at least two wax components.

17. The adhesive of claim 1, wherein $Mw_{waxi}$ is from about 450 to about 4000 g/mole and $Mw_{wax2}$ is from about 5000 to about 20,000 g/mole.

18. The adhesive of claim 1, wherein a weight ratio of the first wax component to the second wax component in the at least two wax components is from about 10:90 to about 90:10.

19. The adhesive of claim 1, wherein a weight ratio of the first wax component to the second wax component in the at least two wax components is from about 30:70 to about 70:30.

20. The adhesive of claim 1, wherein the first wax component has a Brookfield viscosity at 190° C. of 100 mPa-s or less and the second wax component has a viscosity at 190° C. of 190 mPa-s or more.

21. The adhesive of claim 1, wherein said adhesive has a Shear Adhesion Fail Temperature (SAFT) of at least 100° C.

22. The adhesive of claim 1, wherein the polyolefin base polymer has a viscosity at 190° C. in the range from 1000 to 10,000 mPa-s and the adhesive has a viscosity at 177° C. from 500 to 2000 mPa-s.

23. A method of joining substrates, comprising maintaining a reservoir of molten hot melt adhesive, applying the hot melt adhesive from the reservoir to a first substrate, placing a second substrate in contact with the adhesive applied to the first substrate, and applying adhering pressure for a period of time about equal to or greater than the characteristic set time of the adhesive, characterized by introducing into the reservoir an adhesive comprising a polyolefin base polymer and from 1 to 15 wt % of at least two wax components, based on the total weight of the polyolefin base polymer and the at least two wax components; wherein the at least two wax components comprise a first wax component and a second wax component wherein the weight average molecular weight of the second wax component ($Mw_{wax2}$) is at least 1000 g/mole greater relative to the weight average molecular weight of the first wax component ($Mw_{wax1}$) and wherein $Mw_{wax1}$ is less than about 4000 g/mole and $Mw_{wax2}$ is greater than about 5000 g/mole.

24. The method of claim 23, wherein the time period for application of the adhering pressure is 2 seconds or less.

* * * * *